(12) United States Patent
Nishikawa

(10) Patent No.: US 9,369,324 B2
(45) Date of Patent: Jun. 14, 2016

(54) COMMUNICATION APPARATUS AND COMMUNICATION METHOD

(71) Applicant: ICOM INCORPORATED, Osaka (JP)

(72) Inventor: Nobuyoshi Nishikawa, Osaka (JP)

(73) Assignee: ICOM Incorporated, Osaka (JP)

( * ) Notice: Subject to any disclaimer, the term of this patent is extended or adjusted under 35 U.S.C. 154(b) by 77 days.

(21) Appl. No.: 13/973,801

(22) Filed: Aug. 22, 2013

(65) Prior Publication Data

US 2014/0140421 A1 May 22, 2014

(30) Foreign Application Priority Data

Nov. 16, 2012 (JP) .................................. 2012-251853
Dec. 13, 2012 (JP) .................................. 2012-272374

(51) Int. Cl.
*H04L 27/00* (2006.01)
*H04L 27/26* (2006.01)

(52) U.S. Cl.
CPC .................................. *H04L 27/2618* (2013.01)

(58) Field of Classification Search
CPC . H04L 27/2614; H04L 5/0007; H04L 5/0037; H04L 5/0044; H04L 5/0023
USPC .................................................. 375/260, 295
See application file for complete search history.

(56) References Cited

U.S. PATENT DOCUMENTS

| | | | | |
|---|---|---|---|---|
| 6,717,985 B1* | 4/2004 | Poon | | 375/229 |
| 7,340,006 B2* | 3/2008 | Yun | | H04L 27/2618 375/260 |
| 7,496,028 B2* | 2/2009 | Jung | | H04L 27/2618 370/208 |
| 7,929,409 B2* | 4/2011 | Chitrapu et al. | | 370/208 |
| 8,009,764 B2* | 8/2011 | Kwon et al. | | 375/296 |
| 8,300,714 B2* | 10/2012 | Yun | | H04L 27/2618 370/206 |
| 8,718,153 B2* | 5/2014 | Kim | | H04L 27/2607 342/196 |
| 8,995,566 B2* | 3/2015 | Nishikawa | | H04L 27/2614 375/296 |
| 2004/0196916 A1* | 10/2004 | Bohnke et al. | | 375/260 |
| 2006/0120269 A1* | 6/2006 | Kim | | H04L 25/03866 370/208 |
| 2008/0219147 A1* | 9/2008 | Hara | | H04H 20/33 370/210 |
| 2008/0260055 A1* | 10/2008 | Kim | | H04L 5/0007 375/260 |

(Continued)

FOREIGN PATENT DOCUMENTS

JP 2006-165781 6/2006
JP 2007-300314 A 11/2007

(Continued)

OTHER PUBLICATIONS

Choi et al. ; A PRSC selection scheme based on PN code for OFDM PAPR reduction, ISPACS 2004. pp. 222-225, Nov. 2004.*

(Continued)

*Primary Examiner* — Young T. Tse
*Assistant Examiner* — Berhanu Tadese
(74) *Attorney, Agent, or Firm* — Warner Norcross & Judd LLP

(57) ABSTRACT

The communication apparatus comprises a modulator that modulates an input signal to generate a modulated signal; an inserter that inserts a predetermined element into the modulated signal at a predetermined position to generate inserted data of which the number of elements is equal to a size of Fast Fourier Transformation (FFT); a calculator that calculates Peak-to-Average Power Ratio (PAPR) of a baseband signal corresponding to the inserted data; and a transmitter transmits a transmission signal corresponding to the baseband signal based on the calculated PAPR.

11 Claims, 23 Drawing Sheets

(56) References Cited

U.S. PATENT DOCUMENTS

| | | | | |
|---|---|---|---|---|
| 2009/0219802 | A1* | 9/2009 | Han | H04W 56/0015 370/210 |
| 2009/0268604 | A1* | 10/2009 | Yun | H04L 27/2633 370/210 |
| 2010/0177832 | A1* | 7/2010 | Baliga | H04L 27/2614 375/260 |
| 2012/0257690 | A1* | 10/2012 | Li | H04L 27/2618 375/296 |

FOREIGN PATENT DOCUMENTS

| | | | | |
|---|---|---|---|---|
| JP | WO 2008078357 A1 * | 7/2008 | | H04L 5/0007 |
| JP | 2009-296506 A | 12/2009 | | |
| WO | 2008/078357 A1 | 3/2008 | | |

OTHER PUBLICATIONS

Ryu et al., Dummy sequence insertion (DSI) for PAPR reduction in the OFDM communication system, IEEE 2006.*

Choi et al.; "A PRSC selection scheme based on PN code for OFDM PAPR reduction," Intelligent Signal Processing and Communication Systems, 2004. ISPACS 2004.*

Heung-Gyoon Ryu et al., Dummy Sequence Insertion (DSI) for PAPR Reduction in the OFDM Communication System, Consumer Electronics, IEEE Transactions on, IEEE, Feb. 2004, vol. 50, Issue 1, pp. 89-94.*

Japanese Patent Office Action.

* cited by examiner

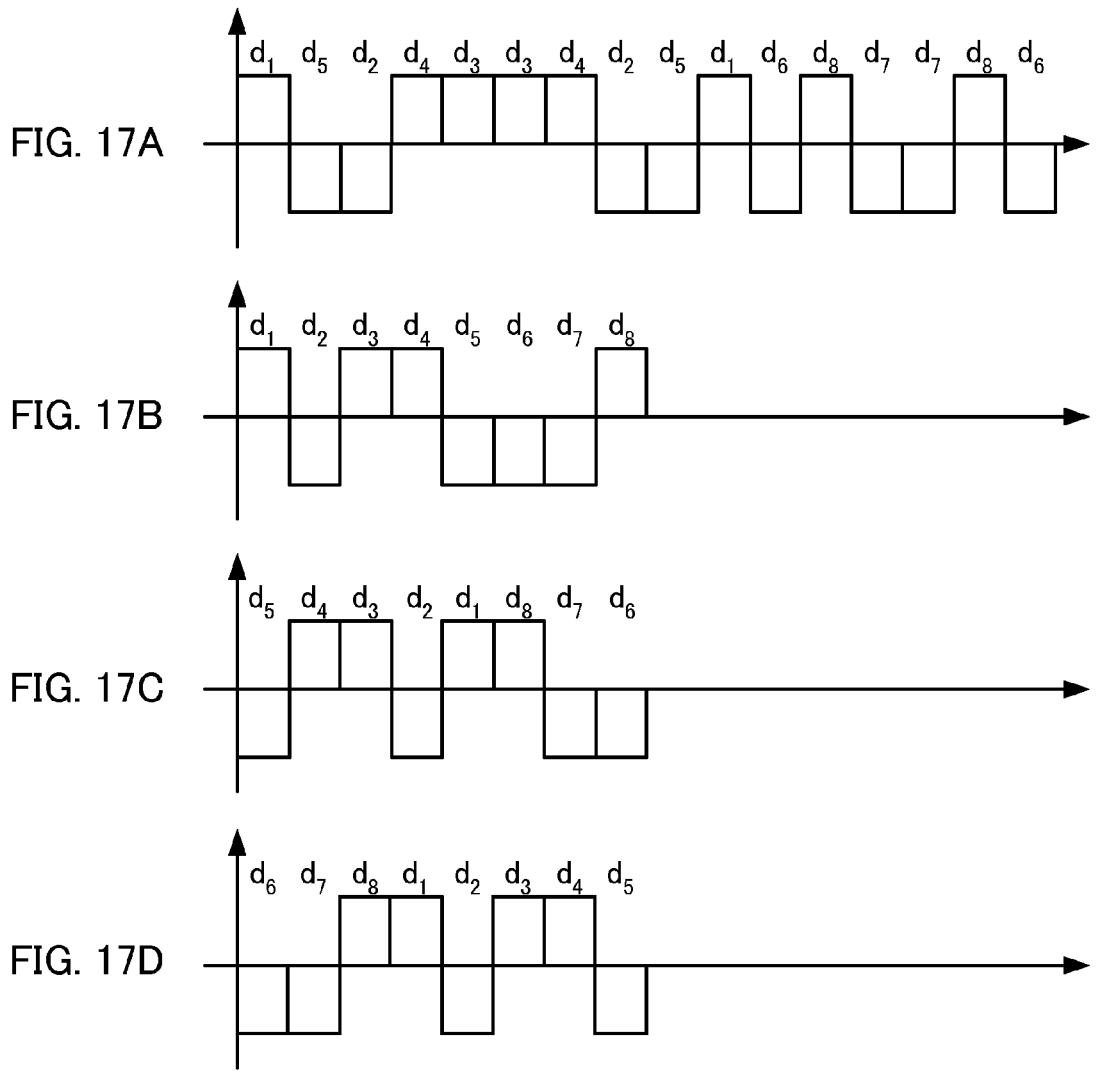

COMMUNICATION APPARATUS AND COMMUNICATION METHOD

CROSS-REFERENCE TO RELATED APPLICATION

This application claims the benefit of Japanese Patent Application No. 2012-251853, filed on Nov. 16, 2012, and Japanese Patent Application No. 2012-272374, filed on Dec. 13, 2012, the entire disclosure of which is incorporated by reference herein.

FIELD

This application relates to a communication apparatus and a communication method.

BACKGROUND

In OFDM (Orthogonal Frequency-Division Multiplexing) communication, PAPR (Peak-to-Average Power Ratio) becomes higher as FFT (Fast Fourier Transformation) size is increased.

Unexamined Japanese Patent Application Kokai Publication No. 2006-165781 discloses an OFDM communication apparatus controlling the phase of subcarrier modulated signal based on the optimum phase calculated by a sequential decision procedure, prior to IFFT (Inverse Fast Fourier Transformation) in order to reduce the PAPR.

However, the above OFDM communication apparatus needs to repeat the calculation to calculate the optimum phase for reducing the PAPR and control the phase on the basis of subcarrier.

SUMMARY

Accordingly, it is an object of the present invention to simplify the process for reducing the PAPR.

To achieve the objective, there is provided a communication apparatus according to a first aspect of the invention, comprising:

a modulator that modulates an input signal to generate a modulated signal;

an inserter that inserts a predetermined element into the modulated signal at predetermined position, to generate inserted data of which the number of elements is equal to a size of Fast Fourier Transformation (FFT);

a calculator that calculates Peak-to-Average Power Ratio (PAPR) of a baseband signal corresponding to the inserted data; and a transmitter that transmits a transmission signal corresponding to the baseband signal based on the calculated PAPR.

It is preferable that the communication apparatus further comprises:

a determiner that determines whether the PAPR matches with a predetermined reference, wherein:

the transmitter transmits the transmission signal corresponding to the baseband signal having the PAPR when the determiner determines that the PAPR matches with the predetermined reference.

It is preferable that the element inserted into the modulated signal are the element of a redundant signal, and the inserter inserts the element of the redundant signal into the modulated signal at the predetermined position, to generate the inserted data.

It is preferable that the inserter inserts the element of a redundant signal different from the redundant signal into the modulated signal at the predetermined position when the determiner determines that the PAPR does not match with the predetermined reference, to generate new inserted data, and the calculator calculates the PAPR of the baseband signal corresponding to the new inserted data.

It is preferable that the determiner determines whether the PAPR of the baseband signal corresponding to the new inserted data matches with the predetermined reference, and the inserter shifts the redundant signal and inserts the element of the shifted redundant signal into the modulated signal at predetermined position when the determiner determines that the PAPR does not match with the predetermined reference, to generate new inserted data.

It is preferable that the communication apparatus further comprises:

a reverser that reverses the element of the inserted data generated by the inserter; and an arithmetic data generator that generates the arithmetic data based on the reversed data in which the element of the inserted data are reversed and the inserted data, wherein:

the calculator calculates the PAPR of the baseband signal corresponding to the inserted data and to the arithmetic data, respectively, and the transmitter transmits the transmission signal corresponding to the baseband signal based on the respective calculated PAPR.

It is preferable that the element inserted into the modulated signal are a predetermined complex number different from any possible value of the elements of the modulated signal, and the inserter inserts the complex number into the modulated signal at the predetermined position to generate the inserted data.

It is preferable that the communication apparatus further comprises:

a determiner that determines whether the PAPR matches with a predetermined reference, wherein:

the transmitter that transmits the transmission signal corresponding to the baseband signal having the PAPR when the determiner determines that the PAPR matches with the predetermined reference.

It is preferable that the communication apparatus further comprises:

a shifter that shifts the reversed data, wherein:

the shifter shifts the reversed data when the determiner determines that the PAPR does not match with the predetermined reference, the arithmetic data generator generates new arithmetic data based on the shifted data that are the reversed data after being shifted and the inserted data, and the determiner generates the baseband signal corresponding to the new calculated data and determines whether the PAPR of the baseband signal matches with the predetermined reference.

It is preferable that the shifter shifts the reversed data with changing the number of shifts when the determiner determines that the PAPR does not match with the predetermined reference.

It is preferable that the communication apparatus further comprises:

a receiver that receives the transmission signal and generates baseband signal from the transmission signal;

a converted data generator that performs FFT on the baseband signal to generate converted data;

an extractor that extracts the element corresponding to the position of the element of the modulated signal based on a rule predetermined with the transmission source of the transmission signal; and a demodulator that demodulates data comprising the extracted element.

It is preferable that the communication apparatus further comprises:

a receiver that receives the transmission signal and generates baseband signal from the transmission signal;

a converted data generator that performs FFT on the baseband signal to generate converted data;

a divider that divides the converted data into two sets of data based on a rule predetermined with the transmission source of the transmission signal and generates reversed received data that are one of the sets of divided data of which the element are reversed;

a correlator that determines whether there is a predetermined correlation between the reference data that are the other set of divided data and the reversed received data and if there is a correlation, generating restored data of which the element are the respective average values of the elements between the reference data and the reversed received data from each of which a complex number predetermined with the transmission source is subtracted; and a demodulator that demodulates the restored data generated by the correlator.

It is preferable that the correlator repeatedly determines whether there is the correlation with changing the number of shifts of the reversed received data, and if none of the shifted data has the correlation with the reference data, uses the reference data as the restored data, and the demodulator demodulates the reference data used as the restored data by the correlator.

A communication method according to a second aspect of the invention comprising:

a modulation step of modulating an input signal to generate a modulated signal;

an insertion step of inserting a predetermined element into the modulated signals at a predetermined position to generate inserted data of which the number of elements is equal to a size of Fast Fourier Transformation (FFT);

a calculation step of calculating Peak-to-Average Power Ratio (PAPR) of a baseband signal corresponding to the inserted data; and a transmission step of transmitting a transmission signal corresponding to the baseband signal based on the calculated PAPR.

According to the invention, it is possible to simplify the process for reducing the PAPR.

BRIEF DESCRIPTION OF THE DRAWINGS

A more complete understanding of this application can be obtained when the following detailed description is considered in conjunction with the following drawings, in which:

FIGS. 17A to 17D are charts illustrating an example of the arithmetic processing on the reception side of the communication apparatus according to the second embodiment;

DETAILED DESCRIPTION

First Embodiment

Figure 1:
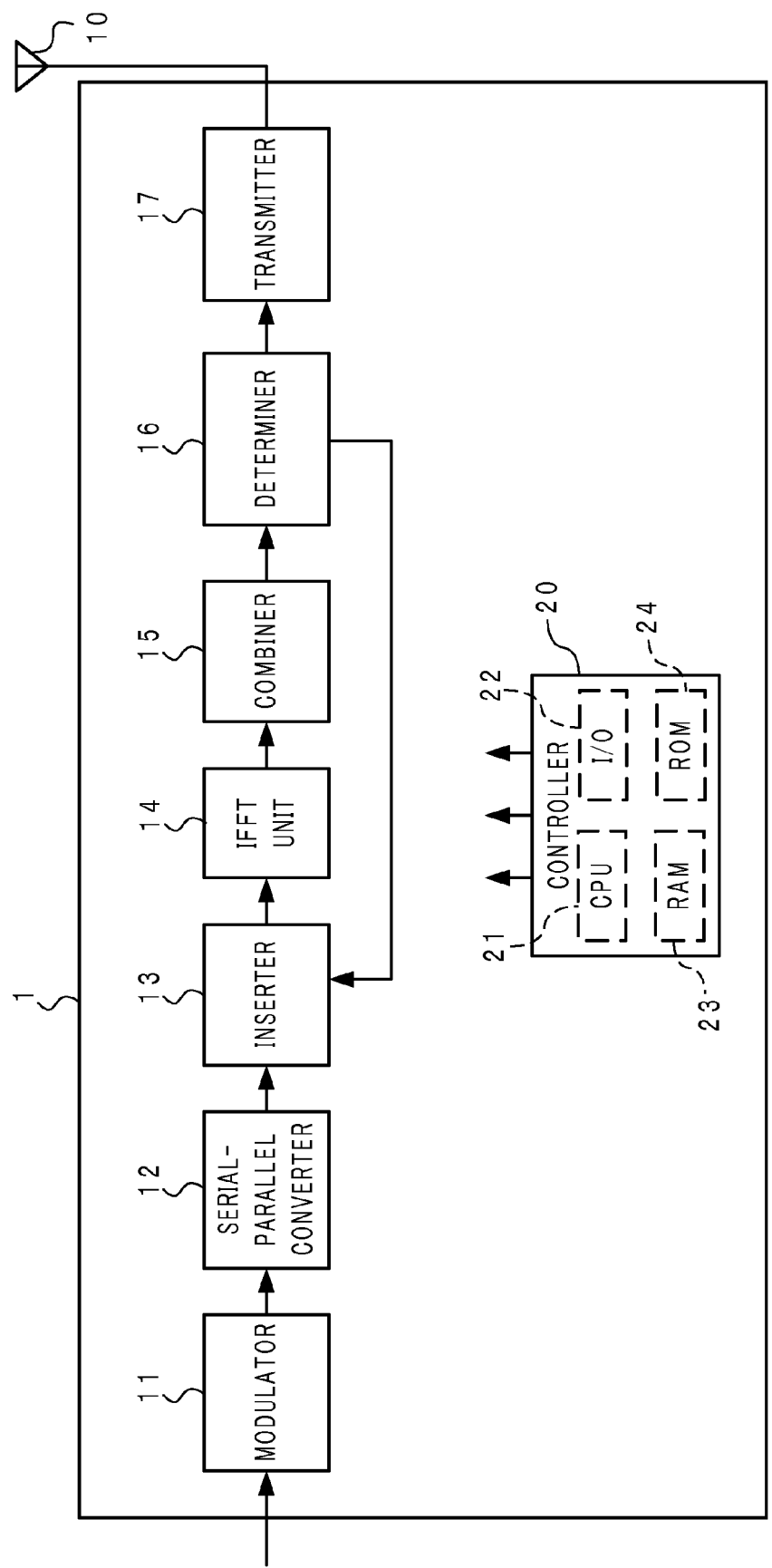
FIG. 1 is a block diagram illustrating a configuration example of a communication apparatus according to a first embodiment of the invention.

An exemplary embodiment of the invention will be described in detail herein with reference to the accompanying drawings. Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

A communication apparatus 1 of the first embodiment, as shown in FIG. 1, communicates with other apparatuses through wireless communication of an OFDM (Orthogonal Frequency-Division Multiplexing) scheme. The communication apparatus 1 comprises an antenna 10, a modulator 11, a serial-parallel converter 12, an inserter 13, an IFFT unit 14, a combiner 15, a determiner 16, a transmitter 17, and a controller 20.

The controller 20 comprises a CPU (Central Processing Unit) 21, a RAM (Random Access Memory) 23, and a ROM (Read Only Memory) 24. Signal lines from the controller 20 to the individual components are omitted to avoid complication and for the ease case of understanding. The controller 20 is connected to the individual components of the communication apparatus 1 via an I/O (Input/Output) 22. The controller 20 controls the contents, start, ending, of processing of the components of the communication apparatus 1.

The RAM 23 stores, for example, data for generating a transmission frame. The ROM 24 stores a control program for the controller 20 to control the operation of the communication apparatus 1. The controller 20 controls the communication apparatus 1 based on the control program.

Figure 2:
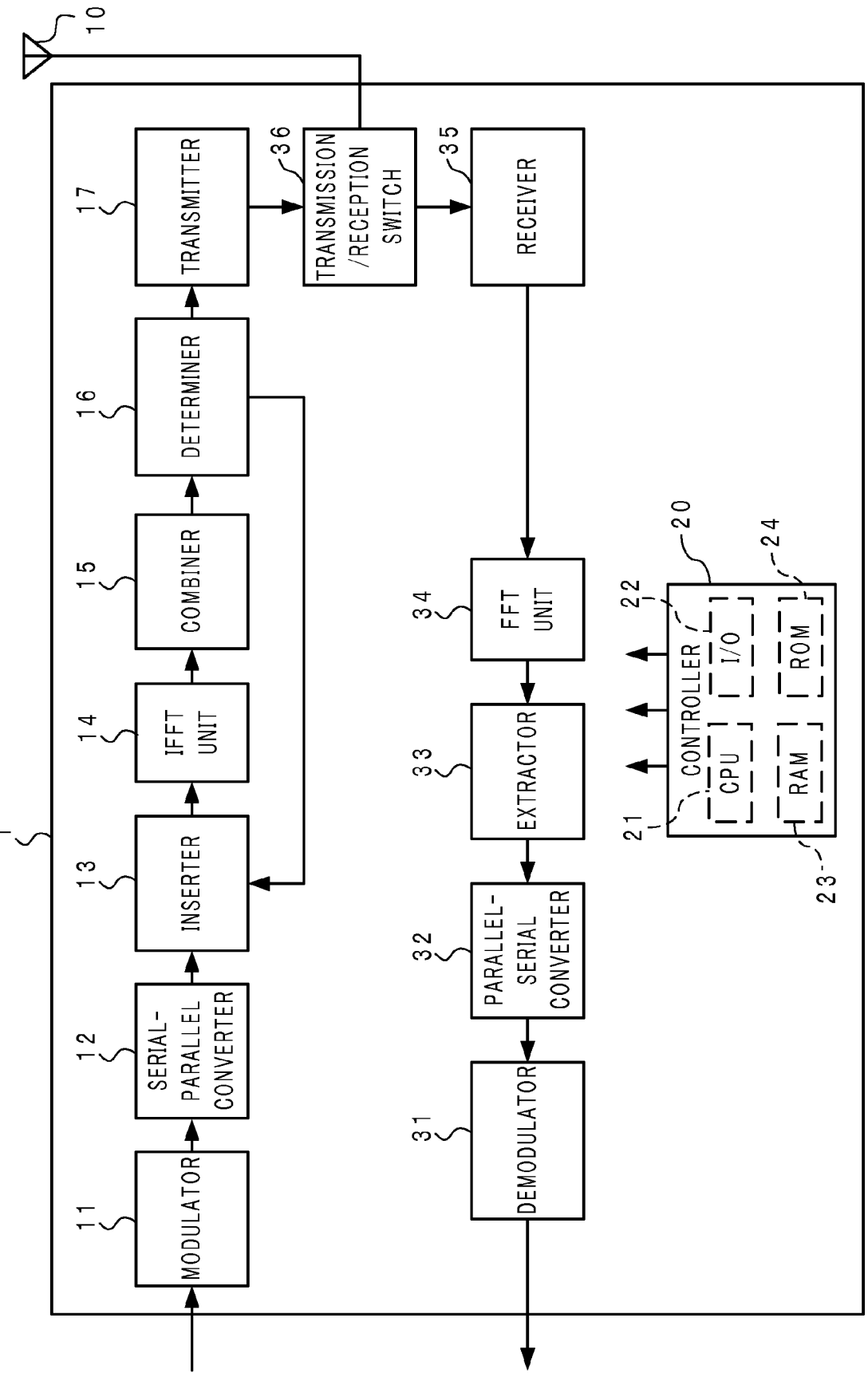
FIG. 2 is a block diagram illustrating a configuration example of a communication apparatus comprising reception capability in the communication apparatus shown in FIG. 1.

The communication apparatus 1 shown in FIG. 2 is provided with reception capability in the communication apparatus 1 shown in FIG. 1. The communication apparatus 1 comprises, in addition to the configuration of the communication apparatus 1 shown in FIG. 1, a demodulator 31, a parallel-serial converter 32, an extractor 33, an FFT unit 34, a receiver 35, and a transmission/reception switch 36.

The modulator 11 modulates an input signal to generate a modulated signal. The modulator 11 sends the modulated signal to the serial-parallel converter 12. The modulation scheme is, for example, QPSK (quadrature phase-shift keying). The serial-parallel converter 12 performs serial-parallel conversion on the modulated signal and sends the serial-parallel converted signal to the inserter 13. The inserter 13 inserts an element of a redundant signal into the serial-parallel converted modulated signal at a predetermined position. The redundant signal is a set of given data. Then, the inserter 13 generates inserted data of which the number of elements is equal to the FFT size. The inserter 13 sends the inserted data to the IFFT unit 14.

Provided that the transmission side and reception side share information regarding the insert position of the element of a redundant signal, the insert position of the element of a redundant signal can be determined on an arbitrary basis. The inserter 13 uses, for example, random signal or data series having an autocorrelation property as the redundant signal. The data series having an autocorrelation property is the data series of which the autocorrelation value to the same data series in which no data shift has been conducted, is higher than the autocorrelation value to the data series in which any data shift has been conducted. The data series in which any data shift conducted is different in value of at least one element from the data series in which no data shift has been conducted.

The data series having an autocorrelation property is, for example, a CAZAC (Constant Amplitude Zero Auto-Correlation) series or a PN (Pseudorandom Noise) series. A data series having an autocorrelation property and PAPR (Peak-to-Average Power Ratio) lower than the modulated signal is used as the redundant signal. The element of the redundant signal is inserted into the modulated signal at the predetermined position, the PAPR is reduced.

The serial-parallel converted modulated signal is expressed by the following equation (1) in which M is the number of elements of the modulated signal. The modulated signal d in the following explanation mean the serial-parallel converted modulated signal. The redundant signal r is expressed by the following equation (2) in which N is the FFT size. The redundant signal r can be the serial signal or parallel signal.

[Eq. 1]

$$d = \begin{bmatrix} d_1 \\ \vdots \\ d_M \end{bmatrix} \qquad (1)$$

[Eq. 2]

$$r = [r_1 \ \ldots \ r_{N-M}] \qquad (2)$$

Assuming that, for example, M=N/2, the inserter 13 inserts the elements of a redundant signal r immediately after the elements of a modulated signal d to generate inserted data in which the elements of the modulated signal d and the elements of the redundant signal r are alternated. The inserted data are expressed by the following equation (3) in which a suffix T indicates that the matrix is transposed.

[Eq. 3]

$$s = \begin{bmatrix} d_1 & r_1 & d_2 & r_2 & \ldots & d_{\frac{N}{2}} & r_{\frac{N}{2}} \end{bmatrix}^T \qquad (3)$$

Furthermore, the inserter 13 shifts the redundant signal r a predetermined number of times in a predetermined direction. The inserter 13 inserts the elements of the shifted redundant signal r into the modulated signal d at any predetermined positions. For example, the redundant signal $r^{(k)}$ shifted k times to the left is expressed by the following equation (4) in which a suffix k in parentheses indicates the number of shifts. The redundant signal r is not necessarily shifted to the left and can be shifted in any direction.

[Eq. 4]

$$r^{(k)} = [r_{k+1} \ldots r_{N-M} r_1 \ldots r_k]^T \qquad (4)$$

The inserter 13 inserts the element of the redundant signal $r^{(k)}$ immediately after the element of the modulated signal d to generate inserted data in which the element of the modulated signal d and the element of the redundant signal $r^{(k)}$ are alternated. The inserted data is expressed by the following equation (5).

[Eq. 5]

$$s = \begin{bmatrix} d_1 & r_{k+1} & d_2 & r_{k+2} & \ldots & d_{\frac{N}{2}} & r_k \end{bmatrix}^T \qquad (5)$$

Figure 3:
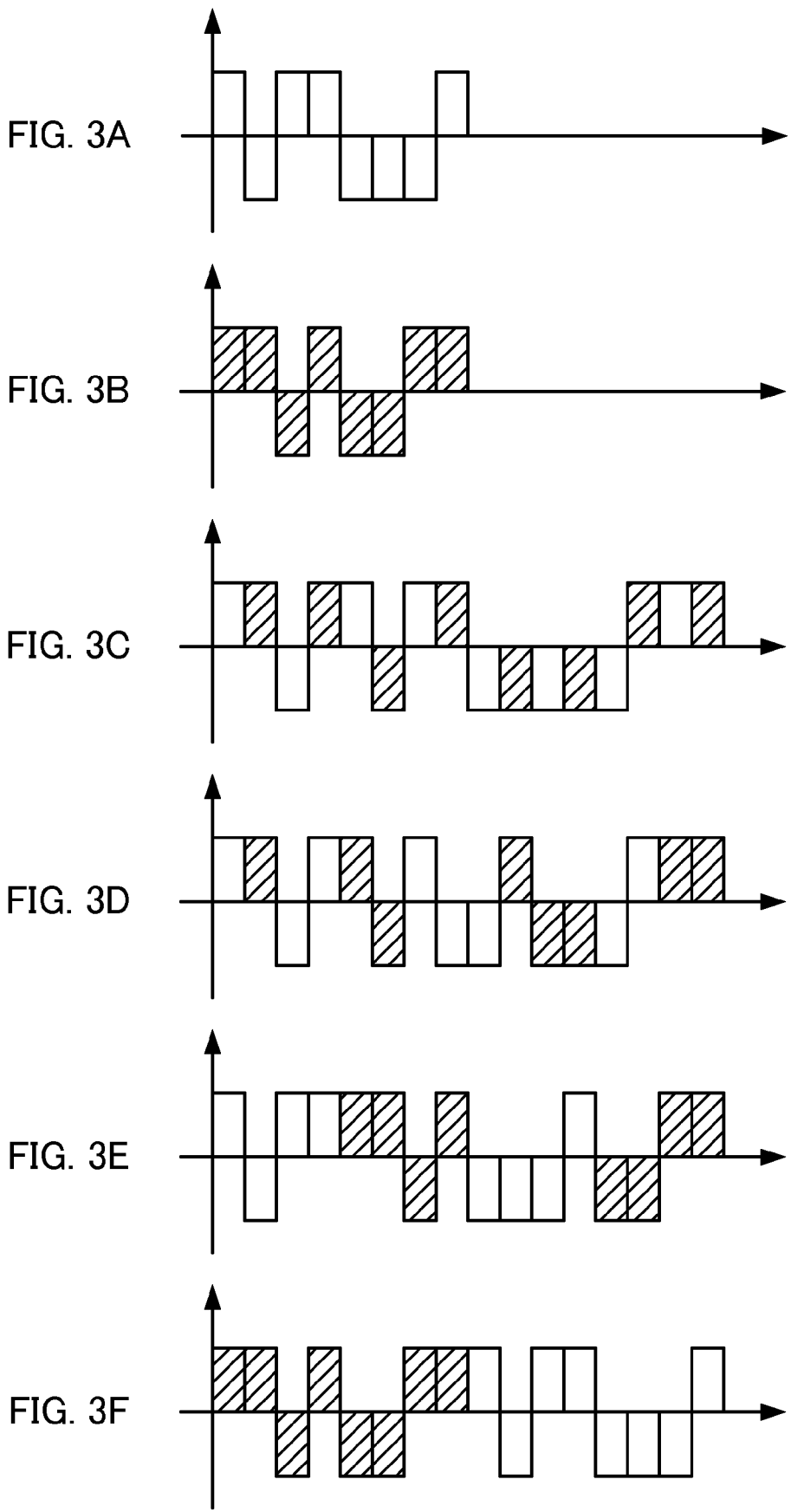
FIGS. 3A to 3F are charts illustrating an example of the insertion processing performed by the inserter according to the first embodiment.

Examples of the insertion performed by the inserter 13 will be described with reference to FIGS. 3A to 3F. Here, the modulated signal d and redundant signal r each have eight elements and the FFT size is 16. In the figures, the elements are plotted as abscissa and the values of the elements are plotted as ordinate. For easier explanation, only the real parts of the elements are shown. The element of a redundant signal r represented by hatched rectangle shown in FIG. 3B are inserted into a modulated signal d represented by white rectangle shown in FIG. 3A at a predetermined position to generate inserted data. FIGS. 3C to 3F each show the inserted data.

As shown in FIG. 3C, the element of a redundant signal r can be inserted so that no element of the redundant signal r is adjoining each other. As shown in FIGS. 3D and 3E, the element of the redundant signal r can be inserted so that some elements of the redundant signal r are adjoining each other. The number of adjoining element of the redundant signal r can vary as shown in FIG. 3D or be equal as shown in FIG. 3E. Furthermore, as shown in FIG. 3F, all elements of a redundant signal r can be inserted before a modulated signal d. As described above, the redundant signal r can be inserted into the modulated signal d at the predetermined position. The redundant signal r does not need to be inserted into a modulated signal d at constant intervals as in a pilot signal used in equalization at the reception side.

Figure 4:
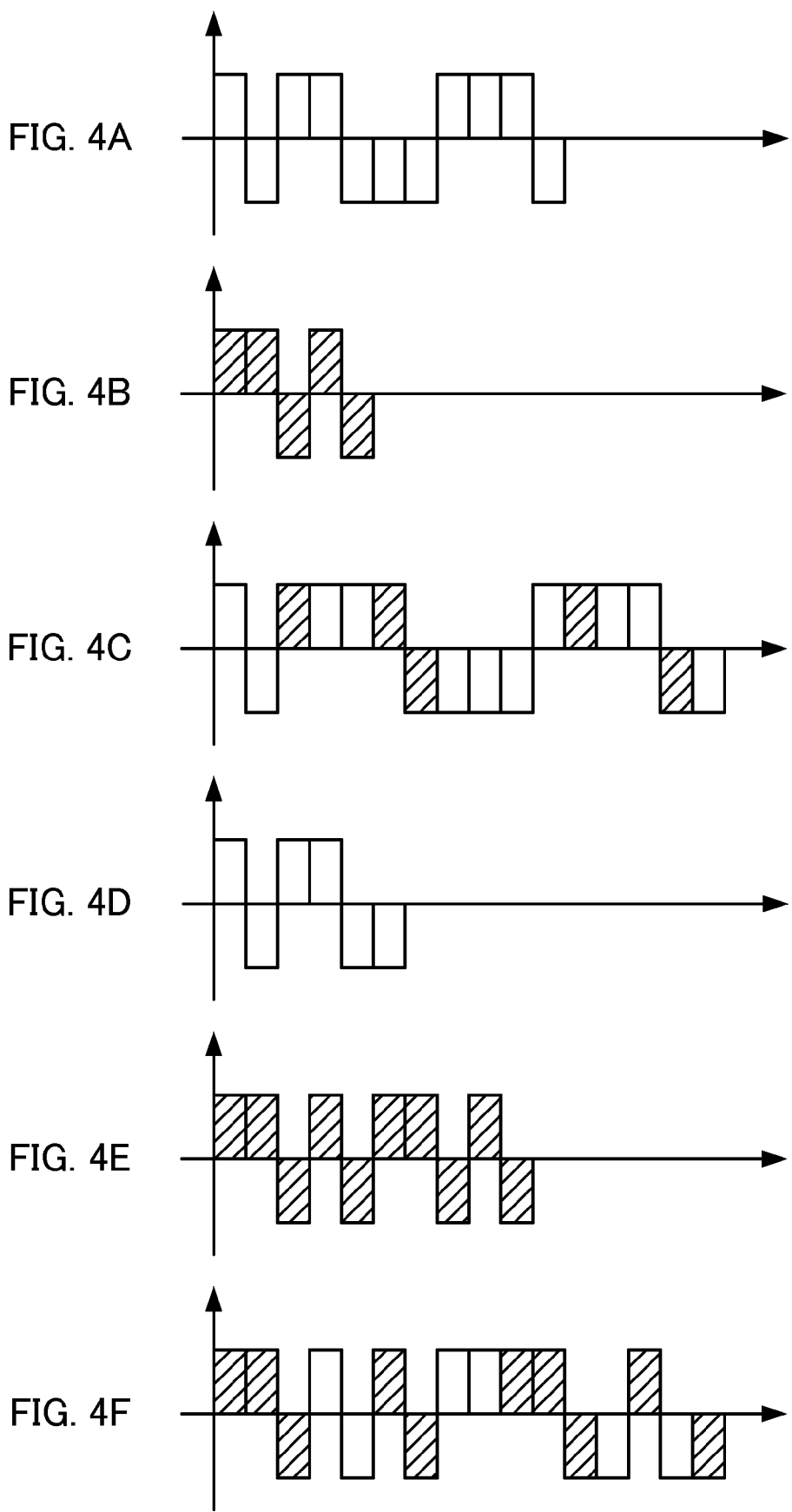
FIGS. 4A to 4F are charts illustrating a different example of the insertion processing performed by the inserter according to the first embodiment.

Furthermore, as shown in FIG. 4, the number of elements of the modulated signal d and the number of elements of a redundant signal r can be different. FIG. 4A shows a modulated signal d having 11 elements. FIG. 4B shows the redundant signal r having five elements. FIG. 4C shows inserted data generated by inserting the redundant signal r shown in FIG. 4B in the modulated signal d shown in FIG. 4A. Furthermore, FIG. 4D shows a modulated signal d having six elements. FIG. 4E shows a redundant signal r having 10 elements. FIG. 4F shows inserted data generated by inserting the redundant signal r shown in FIG. 4E in the modulated signal d shown in FIG. 4D.

The IFFT unit 14 performs an IFFT on the inserted data generated by the inserter 13, and sends the arithmetic results to the combiner 15. The combiner 15 combines the arithmetic results from the IFFT unit 14 to generate baseband signal, and sends the generated baseband signal to the determiner 16. The determiner 16 calculates the PAPR of the baseband signal and determines whether the PAPR matches with a predetermined reference. If the PAPR does not match with the predetermined reference, the determiner 16 notifies the inserter 13 accordingly. In such a case, the inserter 13 generates new inserted data using a different redundant signal r. The inserter 13, IFFT unit 14, and combiner 15 repeat the above process until the determiner 16 determines that the PAPR matches with the predetermined reference. Then, the PAPR of the baseband signal can be reduced.

The inserter 13 repeats the process of generating new inserted data with changing the number of shifts (shift number) of the redundant signal r until the determiner 16 determines that the PAPR of the baseband signal matches with the predetermined reference. When the redundant signal r is a random signal, the probability that the random signal in which any data shift is conducted and the random signal in which no data shift is conducted are equal is significantly low. On the other hand, when the redundant signal r is a data series having an autocorrelation property, a data series in which any data shift is conducted is different in value by at least one element from a data series in which no data shift is conducted. With changing the number of shifts of the redundant signal r and performing the above process repeatedly, the PAPR of the baseband signal can be reduced as in the case of repeating the above process using multiple different redundant signals r prepared in advance.

The controller 20 controls the inserter 13, IFFT unit 14, combiner 15, and determiner 16 to repeat the above process, operating as a repeat means.

If the PAPR of the baseband signal matches with the predetermined reference, the determiner 16 sends the baseband signal to the transmitter 17. The determiner 16 repeats the above process using all redundant signals r prepared in advance. Here, the determiner 16 can be configured to detect the baseband signal having the lowest PAPR or detect the baseband signal having a PAPR lower than the predetermined reference. Furthermore, the determiner 16 can be configured to repeat the above process until the inserter 13 completes one cycle of shifting a redundant signal r and detects the baseband signal having the lowest PAPR.

The transmitter 17 receives the baseband signal from the determiner 16 and generates a transmission signal from the baseband signal. The transmitter 17 sends the generated transmission signal to another apparatus via the transmission/reception switch 36 and antenna 10.

Figure 5:
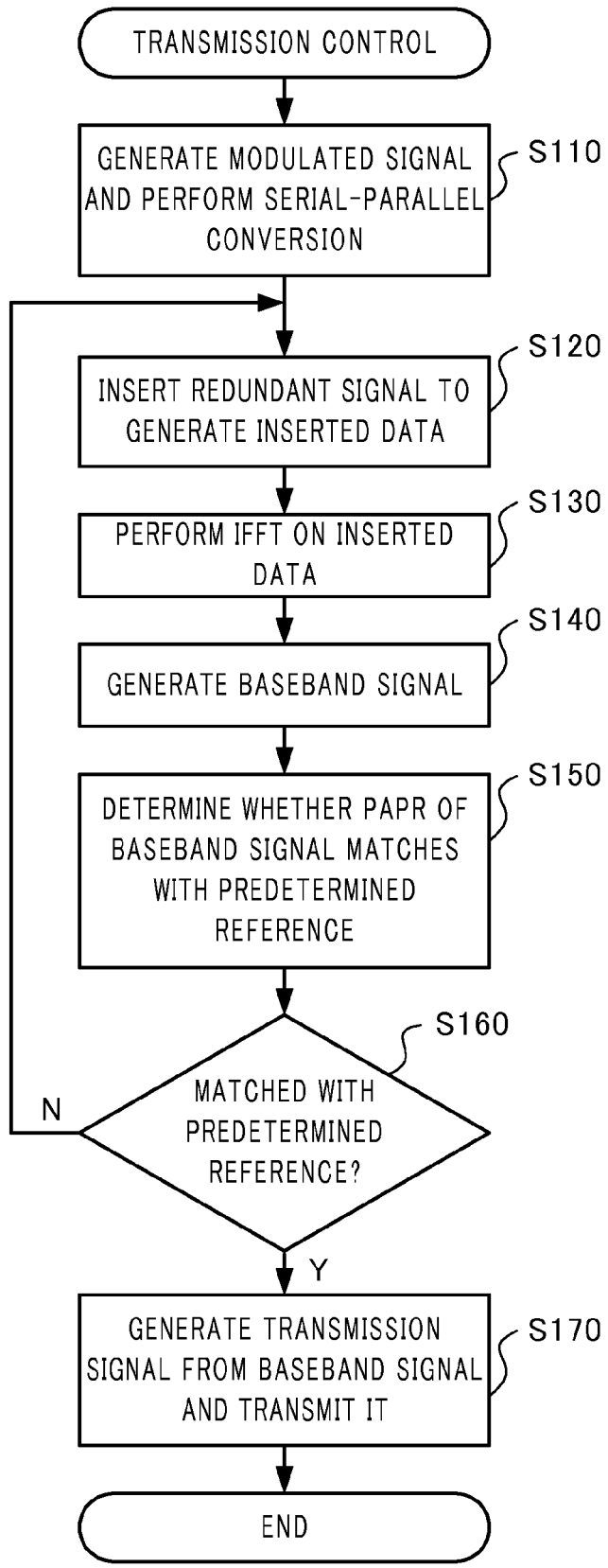
FIG. 5 is a flowchart illustrating an example of the operation for transmission control that is executed by the communication apparatus according to the first embodiment.

The transmission control operation executed by the communication apparatus 1 will be described with reference to the flowchart shown in FIG. 5. The modulator 11 modulates the input signal to generate the modulated signal. The serial-parallel converter 12 performs serial-parallel conversion on the modulated signal generated by the modulator 11 (step S110). The inserter 13 inserts the element of the redundant signal r into the serial-parallel converted modulated signal d at the predetermined position to generate inserted data of which the number of elements is equal to the FFT size (step S120). The IFFT unit 14 performs IFFT on the inserted data generated by the inserter 13 (step S130). The combiner 15 combines the arithmetic results from the IFFT unit 14 to generate the baseband signal (step S140).

The determiner 16 calculates the PAPR of the baseband signal generated by the combiner 15, and determines whether the PAPR matches with the predetermined reference (step S150). If the PAPR of the baseband signal does not comply with the predetermined reference (step S160; N), returning to the step S120, changes the number of shifts of the redundant signal r, and performs the above process. If the PAPR of the baseband signal matches with a predetermined reference (step S160; Y), the transmitter 17 generates a transmission signal from the baseband signal matched by the predetermined reference. The transmitter 17 sends the generated transmission signal to another apparatus via the transmission/reception switch 36 and antenna 10 (step S170). After the transmission in the step S170 is completed, the process ends.

A process at the reception side will be described following. The receiver 35 receives the transmission signal via the antenna 10 and transmission/reception switch 36. The receiver 35 generates a baseband signal from the transmission signal, and performs a serial-parallel conversion on the baseband signal. The receiver 35 sends the series-parallel converted baseband signal to the FFT unit 34. The FFT unit 34 performs an FFT on the serial-parallel converted baseband signal, to generate converted data and sends the converted data to the extractor 33.

The extractor 33 extracts the element of the converted data at a predetermined position to generate extracted data comprising the extracted elements. The extractor 33 sends the extracted data to the parallel-serial converter 32. The predetermined position is the position of the element of the modulated signal d in the inserted data generated at the transmission side. As described above, the position can be determined on an arbitrary basis provided that the transmission side and reception side share information on the insert position of the element of the redundant signal.

The parallel-serial converter 32 performs parallel-serial conversion of the extracted data generated by the extractor 33 and sends the data to the demodulator 31. The demodulator 31 demodulates the parallel-serial converted, extracted data to restore the input signal.

Figure 6:
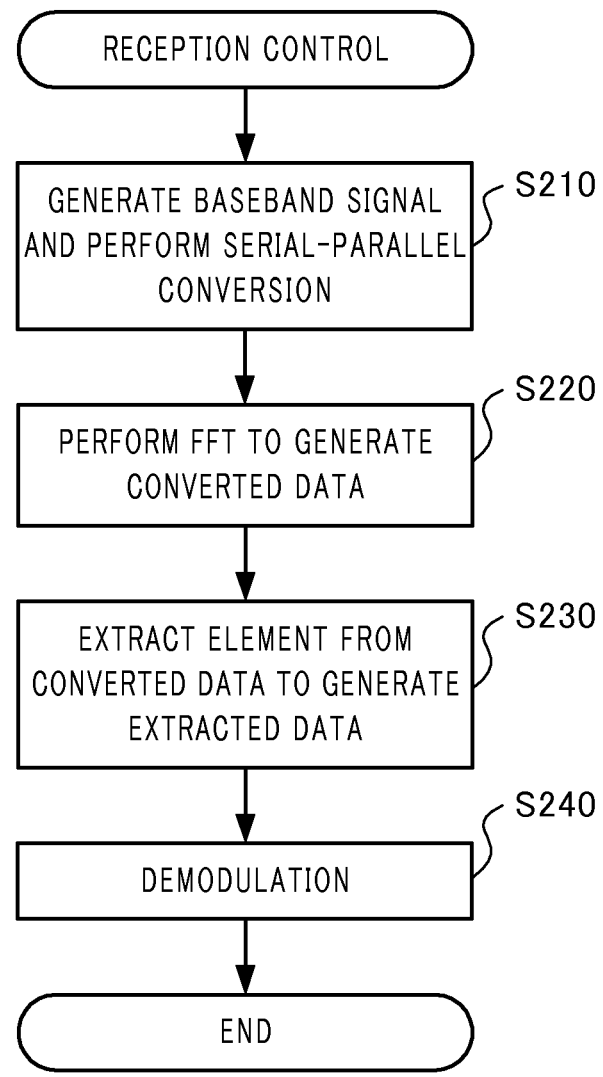
FIG. 6 is a flowchart illustrating an example of the operation for reception control that is executed by the communication apparatus according to the first embodiment.

The reception control operation executed by the communication apparatus 1 will be described with reference to the flowchart shown in FIG. 6. The receiver 35 receives the transmission signal via the antenna 10 and transmission/reception switch 36. The receiver 35 generates the baseband signal from the transmission signal and performs the serial-parallel conversion on the baseband signal (step S210). The FFT unit 34 performs the FFT on the serial-parallel converted baseband signal by the receiver 35, to generate converted data (step S220). The extractor 33 extracts the element of the converted data at the predetermined position to generate extracted data comprising the extracted elements (step S230). The parallel-serial converter 32 performs parallel-serial conversion on the extracted data generated by the extractor 33. The demodulator 31 demodulates the parallel-serial converted, extracted data to restore the input signal (step S240).

As described above, the communication apparatus 1 according to this embodiment inserts the element of the redundant signal r into the modulated signal d, to generate inserted data of which the number of elements is equal to the FFT size in an OFDM communication scheme. The communication apparatus 1 repeats the process of generating new inserted data using different redundant signal r until the PAPR of the baseband signal corresponding to the inserted data matches with the predetermined reference. Thus, the PAPR of the baseband signal can be reduced. Furthermore, repeating the above process is simpler than repeating the calculation in a sequential decision method; thus, the communication apparatus 1 according to this embodiment can simplify the process for reducing the PAPR.

Specific Example

The prior art communication apparatus and the communication apparatus 1 according to this embodiment were compared in the CCDF (complementary cumulative distribution function) characteristic of the PAPR, namely a probability of occurrence of the PAPR, using a QPSK modulation scheme with an FFT size of 2048. The prior art communication apparatus performs serial-parallel conversion on the modulated input signal without the above insertion and performs the IFFT to generate baseband signal.

Figure 7:
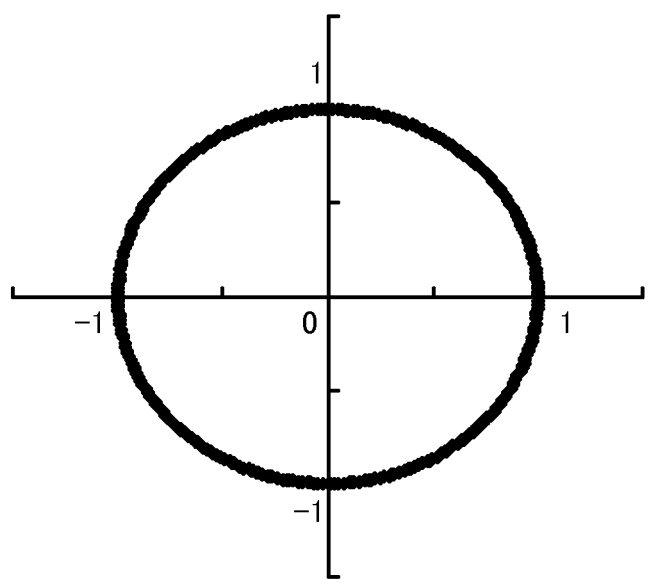
FIG. 7 is a diagram illustrating signal point arrangement of the inserted data according to the first embodiment.

Using the modulated signal d and the redundant signal r each having 1024 elements, the communication apparatus 1 according to this embodiment inserted the elements of the redundant signal r immediately after the elements of the modulated signal d in sequence to generate inserted data in which the elements of the modulated signal d and the elements of the redundant signal r are alternated. The redundant signal r was a CAZAC series. As shown in FIG. 7, the elements of the inserted data have the phase distributed compared with the QPSK signal point arrangement.

Figure 8:
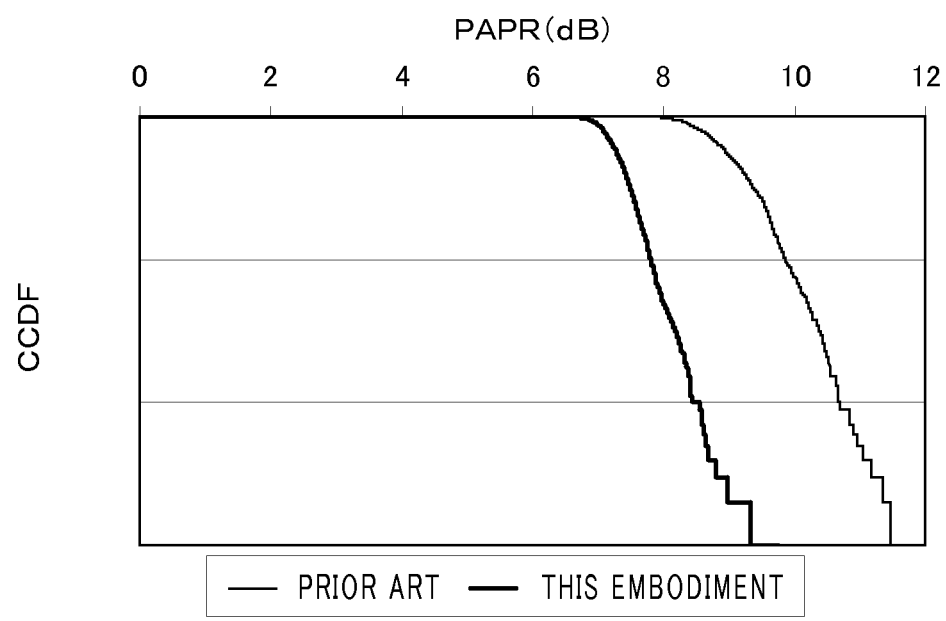
FIG. 8 is a diagram illustrating CCDF characteristic of the PAPR of simulated baseband signal according to the first embodiment.

FIG. 8 shows the CCDF characteristic of the PAPR of the baseband signal. In FIG. 8, the PAPR is plotted as abscissa (unit: dB) and the PAPR CCDF is plotted as ordinate. The CCDF characteristic of PAPR according to the prior art is represented by the thin solid line. The CCDF characteristic of PAPR according to this embodiment is represented by the thick solid line. The PAPR according to this embodiment is lower than the prior art PAPR.

Figure 9:
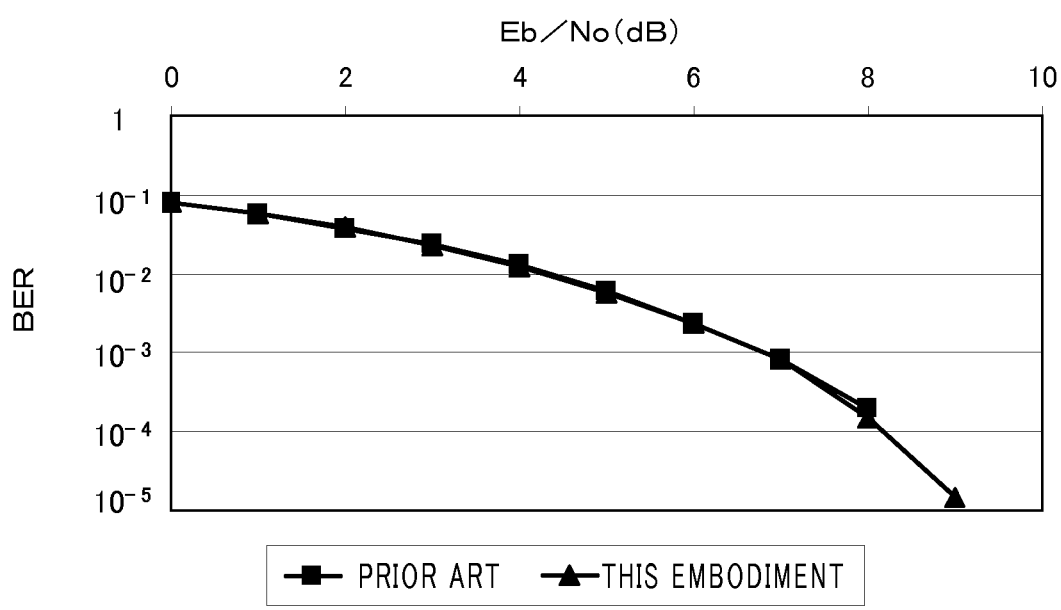
FIG. 9 is a diagram illustrating BER characteristic according to the first embodiment.

FIG. 9 shows the BER (bit error rate) characteristic. In FIG. 9, the Eb/No (energy per bit to noise power spectral density ratio) is plotted as abscissa and the BER is plotted as ordinate. The Eb/No is represented in dB. The prior art BER is plotted using squares. The BER according to this embodiment is plotted using triangles. The prior art BER and the BER according to this embodiment are nearly equal.

Figure 10A:
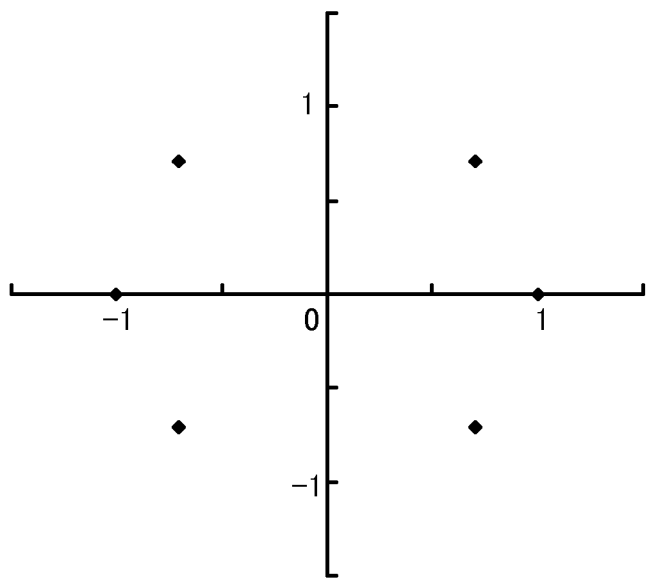
FIGS. 10A and 10B are diagrams illustrating signal point arrangement of the inserted data according to the first embodiment.
Figure 10B:
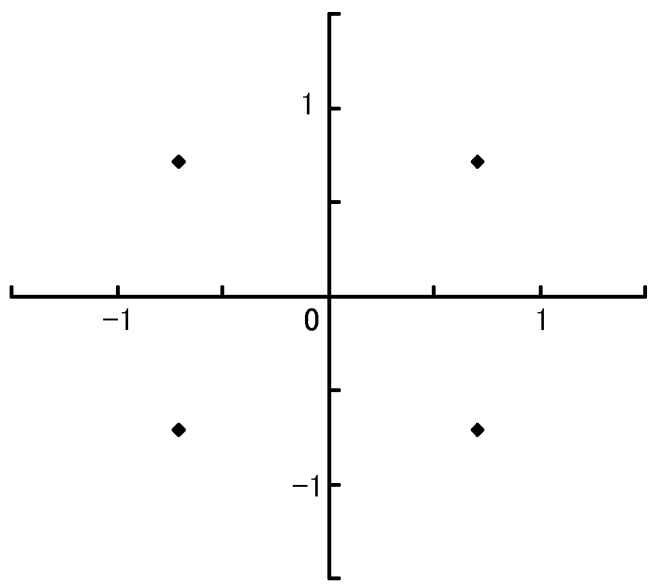

Additionally, using a PN series as the redundant signal r, the inserted data are generated by inserting the elements of the redundant signal r immediately after the elements of the modulated signal d in sequence as in the above case. FIG. 10A is a diagram illustrating signal point arrangement of the inserted data. FIG. 10B is a diagram illustrating signal point arrangement of the inserted data when the elements of the PN series each had the phase rotated by $\pi/4$ or $-\pi/4$.

Figure 11:
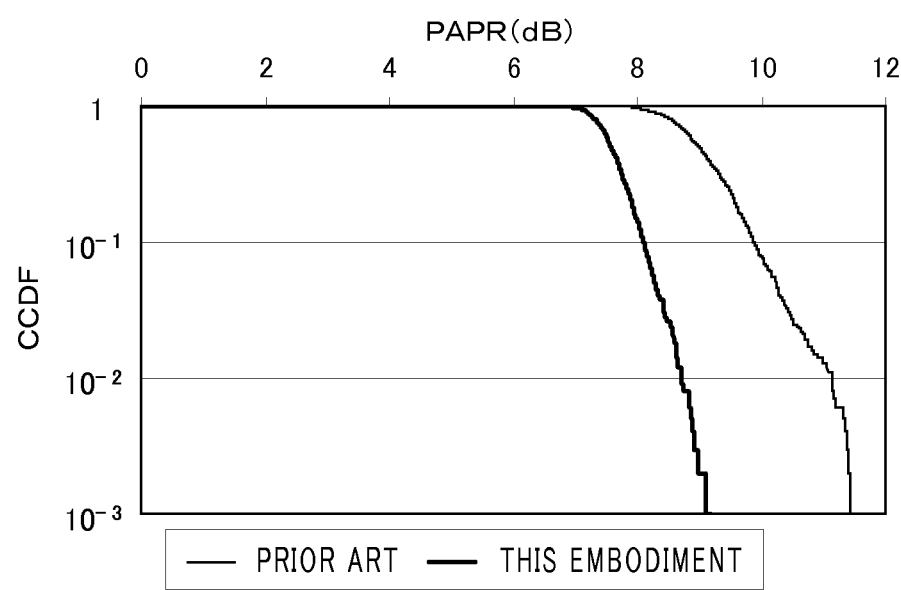
FIG. 11 is a diagram illustrating the CCDF characteristic of the PAPR of simulated baseband signal according to the first embodiment.

FIG. 11 shows the CCDF characteristic of the PAPR of the baseband signal. In FIG. 11, the PAPR is plotted as abscissa (unit: dB) and the PAPR CCDF is plotted as ordinate. The redundant signal r was the PN series. The CCDF characteristic of PAPR according to the prior art is represented by the thin solid line. The CCDF characteristic of PAPR according to this embodiment is represented by the thick solid line. The PAPR according to this embodiment is lower than the prior art PAPR.

Figure 12:
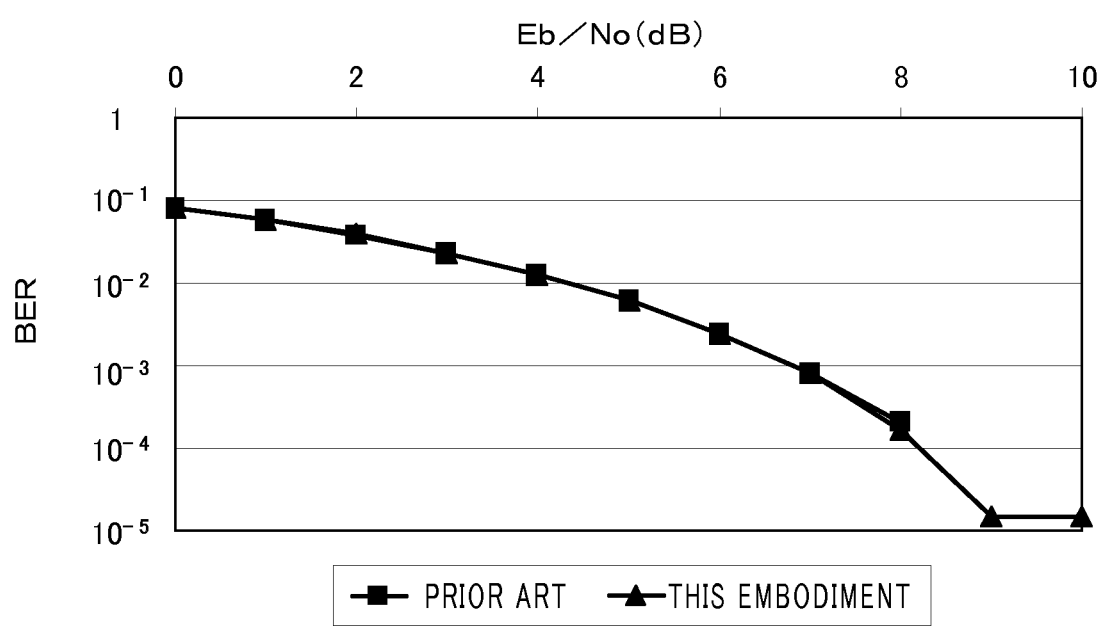
FIG. 12 is a diagram illustrating the BER characteristic according to the first embodiment.

FIG. 12 shows the BER characteristic. The Eb/No is plotted as abscissa and the BER is plotted as ordinate. The Eb/No is represented in dB. The prior art BER is plotted using squares. The BER according to this embodiment is plotted using triangles. The prior art BER and the BER according to this embodiment are nearly equal.

The prior art PAPR was 33.11 dB when the input signal were identical signal of which the modulated signal comprise elements having an identical phase, for example elements all having a value of zero. On the other hand, the PAPR was 27.36 dB when the redundant signal r was the CAZAC series in the communication apparatus 1 according to this embodiment. Furthermore, the PAPR was 27.11 dB when the redundant signal r was the PN series in the communication apparatus 1 according to this embodiment. Furthermore, the PAPR was also 27.11 dB when the redundant signal r was the PN series of which the elements had the phase rotated by $\pi/4$ in the communication apparatus 1 according to this embodiment. Also in the case of the input signal being identical signal, the PAPR of the invention according to this embodiment was lower than the prior art with all of the redundant signal r.

As a result of a simulation with changing the insert position of the element of the redundant signal r, as shown in FIGS. 3C to 3F, the degree of reduction of the PAPR were different.

The above simulation revealed that the PAPR can be reduced by repeating the process of generating new inserted data with changing the insert position of the element of a redundant signal r in a modulated signal until the PAPR of the baseband signal matches with the predetermined reference.

Furthermore, the modulation scheme of the modulator 11 is not limited to the QPSK. Besides the QPSK, the PSK (phase shift keying), QSAM (quadrature amplitude modulation), or the like can be used. Furthermore, the order of the process performed by the serial-parallel converter 12 and inserter 13 can be changed. In other words, the configuration in which the serial-parallel converter 12 performs serial-parallel conversion on the inserted data generated by the inserter 13 is possible.

The redundant signal r used by the inserter 13 is not limited to a data series having an autocorrelation property such as a CAZAC series and PN series, and can be random signal. The inserter 13 can be configured to use, for example, multiple random signals of which the elements have variation in phase as the redundant signal r. The IFFT unit 14 can be configured to perform the IDFT instead of the IFFT. The FFT unit 34 can be configured to perform the DFT instead of the FFT.

Second Embodiment

Second embodiment of the present invention will be described hereafter with reference to the drawings. Also in this embodiment, as with the first embodiment, the IFFT conceptually includes the IFFT and the IDFT. Similarly, the FFT conceptually includes the FFT and the DFT. Additionally, in the case of executing the IDFT and DFT, the FFT size in the following explanation means the DFT size. The same configurations as in the communication apparatus 1 described in the first embodiment are referred to by the same reference numbers and duplicated explanation will be omitted as appropriate.

Figure 13:
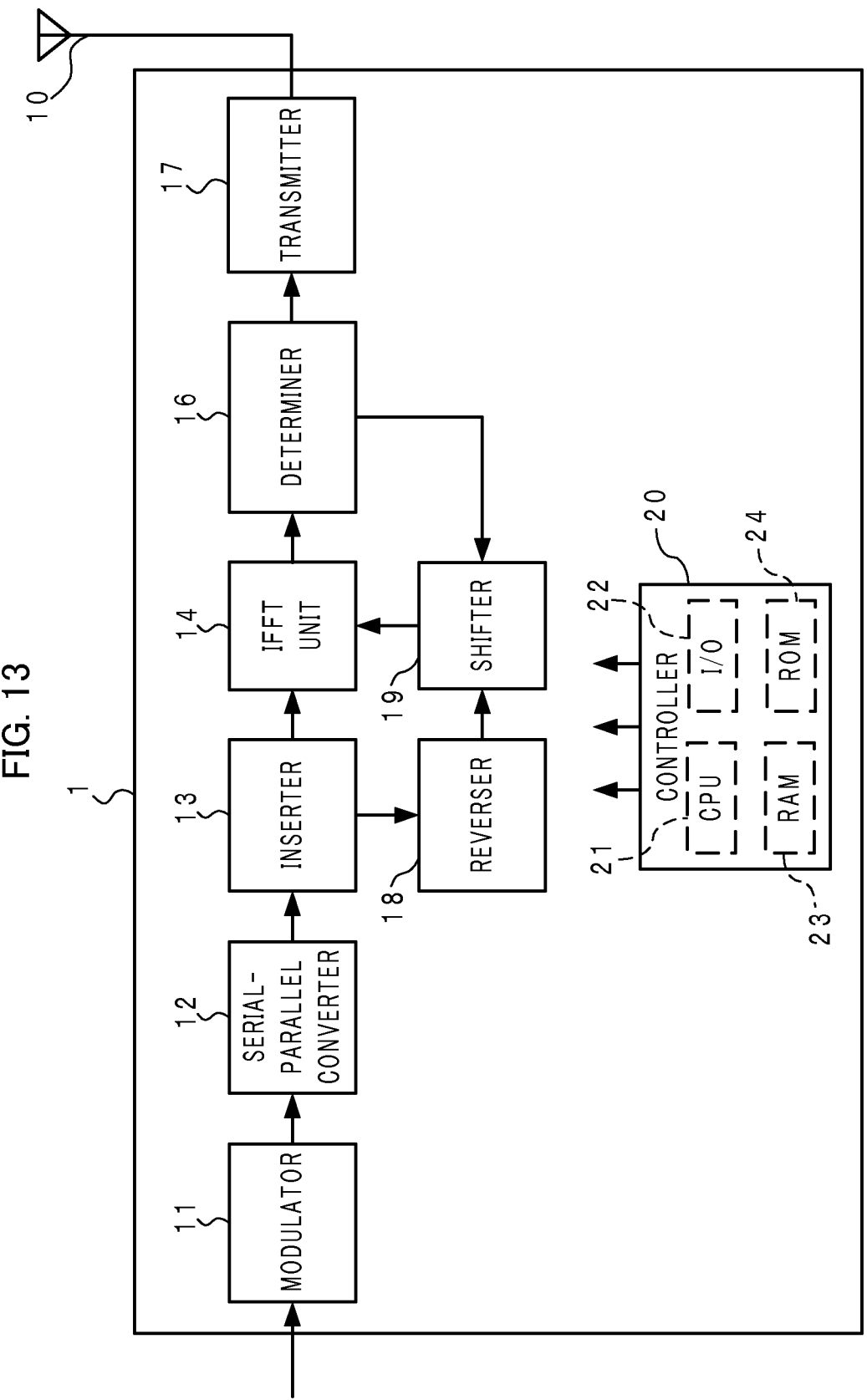
FIG. 13 is a block diagram illustrating a configuration example of the communication apparatus according to a second embodiment of the invention.

A communication apparatus 1 shown in FIG. 13 communicates with other apparatus through wireless communication of an OFDM scheme. The communication apparatus 1 comprises an antenna 10, a modulator 11, a serial-parallel converter 12, an inserter 13, an IFFT unit 14, a determiner 16, a transmitter 17, a reverser 18, a shifter 19, and a controller 20.

Figure 14:
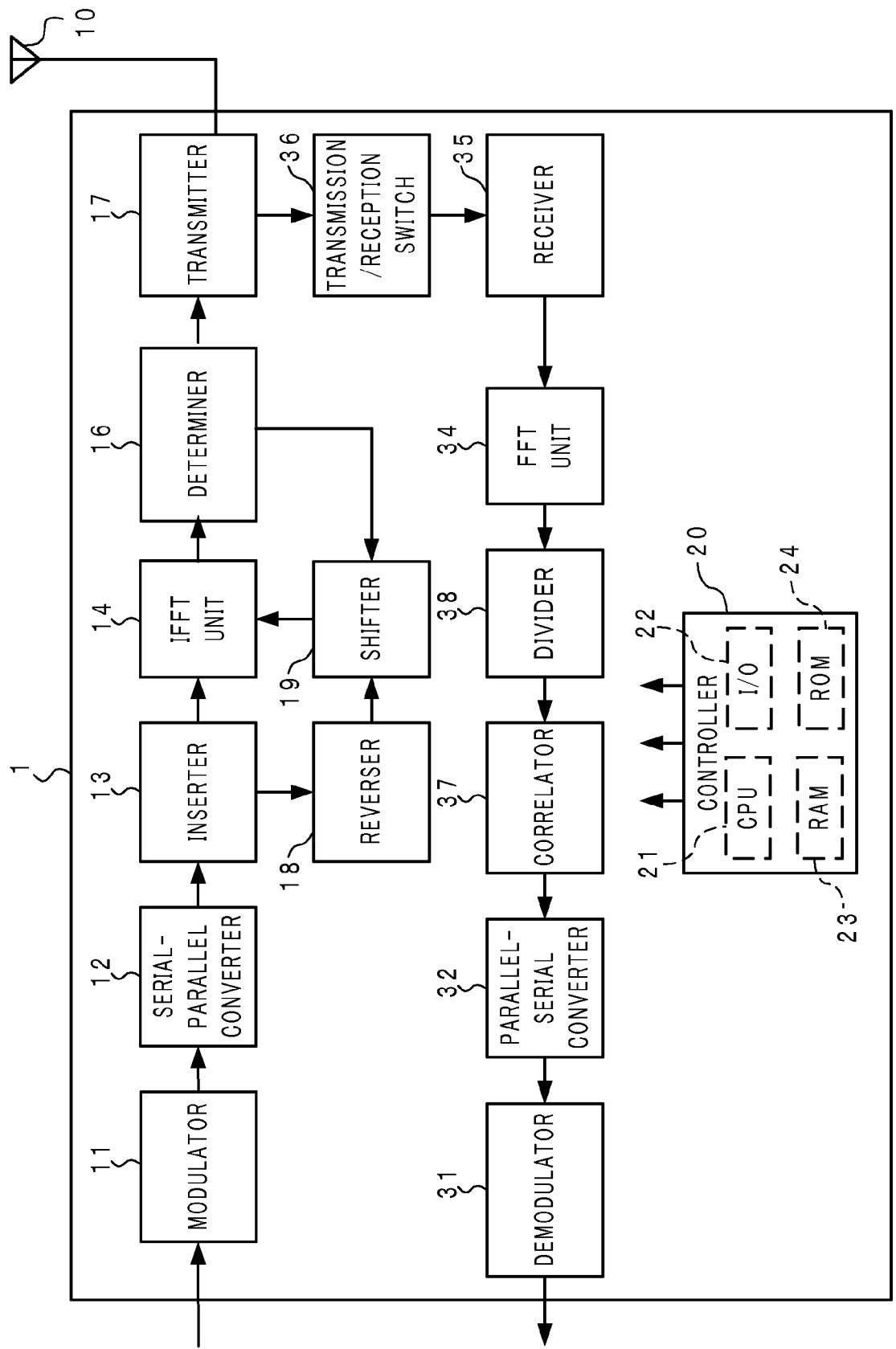
FIG. 14 is a block diagram illustrating a configuration example of the communication apparatus comprising reception capability in the communication apparatus shown in FIG. 13.

The communication apparatus 1 shown in FIG. 14 is provide with reception capability in the communication apparatus 1 shown in FIG. 13. The communication apparatus 1 comprises, in addition to the configuration of the communication apparatus 1 shown in FIG. 13, a demodulator 31, a parallel-serial converter 32, an FFT unit 34, a receiver 35, a transmission/reception switch 36, a correlator 37, and a divider 38.

The inserter 13 inserts a predetermined complex number different from any possible value of the element of a modulated signal immediately before or after each element of the serial-parallel converted modulated signal by the serial-parallel converter 12. The inserter 13 generates inserted data of which the number of elements is equal to the FFT size. In the case of QPSK modulation, the elements of the modulated signal each possibly have a value of $A \cdot e^{i(\pi/4)}$, $A \cdot e^{i(3\pi/4)}$, $A \cdot e^{i(-\pi/4)}$, or $A \cdot e^{i(-3\pi/4)}$ in which A is the absolute value of each element of the modulated signal. Then, in the case of QPSK modulation, the predetermined complex number is a complex number different from any of the above values. The inserter 13 sends the generated inserted data to the IFFT unit 14 and reverser 18.

For example, using zero as the predetermined complex number, the inserter 13 inserts zero immediately after each element of the serial-parallel converted modulated signal. The serial-parallel converted modulated signal d is expressed by the following equation (6). The inserted data f is expressed by the following equation (7). Assuming that the FFT size is N, M in the equation is N/2. A suffix T in the equation indicates that the matrix is transposed. This applies to the following explanation.

[Eq. 6]

$$d = \begin{bmatrix} d_1 \\ \vdots \\ d_M \end{bmatrix} \quad (6)$$

[Eq. 7]

$$f = [d_1 0 d_2 0 \ldots d_M 0]^T \quad (7)$$

The reverser 18 reverses the order of the element of the inserted data to generate reversed data and sends the reversed data to the shifter 19. The reversed data g corresponding to the inserted data f expressed by the above equation (7) is expressed by the following equation (8).

[Eq. 8]

$$g = [0 d_M 0 d_{M-1} \ldots 0 d_1]^T \quad (8)$$

The shifter 19 shifts the reversed data a predetermined number of times that is a multiple number of 2 in a predetermined direction. Then, the shifter 19 generates shifted data that are the reversed data after being shifted, and sends the shifted data to the IFFT unit 14. The shifted data $g^{(k)}$ generated by shifting the reversed data g expressed by the above equation (8), for example, k times upward is expressed by the following equation (9) in which a suffix k in parentheses presents the number of shifts and k=2i. Here, i is an integer equal to or greater than 0 and less than M. The reversed data g is not necessarily shifted upward and can be shifted in any direction.

[Eq. 9]

$$g^{(k)} = [0 \; d_{M-i} \; 0 \; d_{M-i-1} \; \ldots \; 0 \; d_{M-i+1}]^T \quad (9)$$
$$(0 \le i < M)$$

An Arithmetic data h obtained by adding the shifted data $g^{(k)}$ to the inserted data f is expressed by the following equation (10). The IFFT unit 14 executes the IFFT of the inserted data f and the arithmetic data h, respectively, and sends the arithmetic results to the determiner 16.

[Eq. 10]

$$h = f + g^{(k)} \quad (10)$$
$$= [d_1 \; d_{M-i} \; d_2 \; d_{M-i-1} \; \ldots \; d_M \; d_{M-i+1}]^T$$

Figure 15:
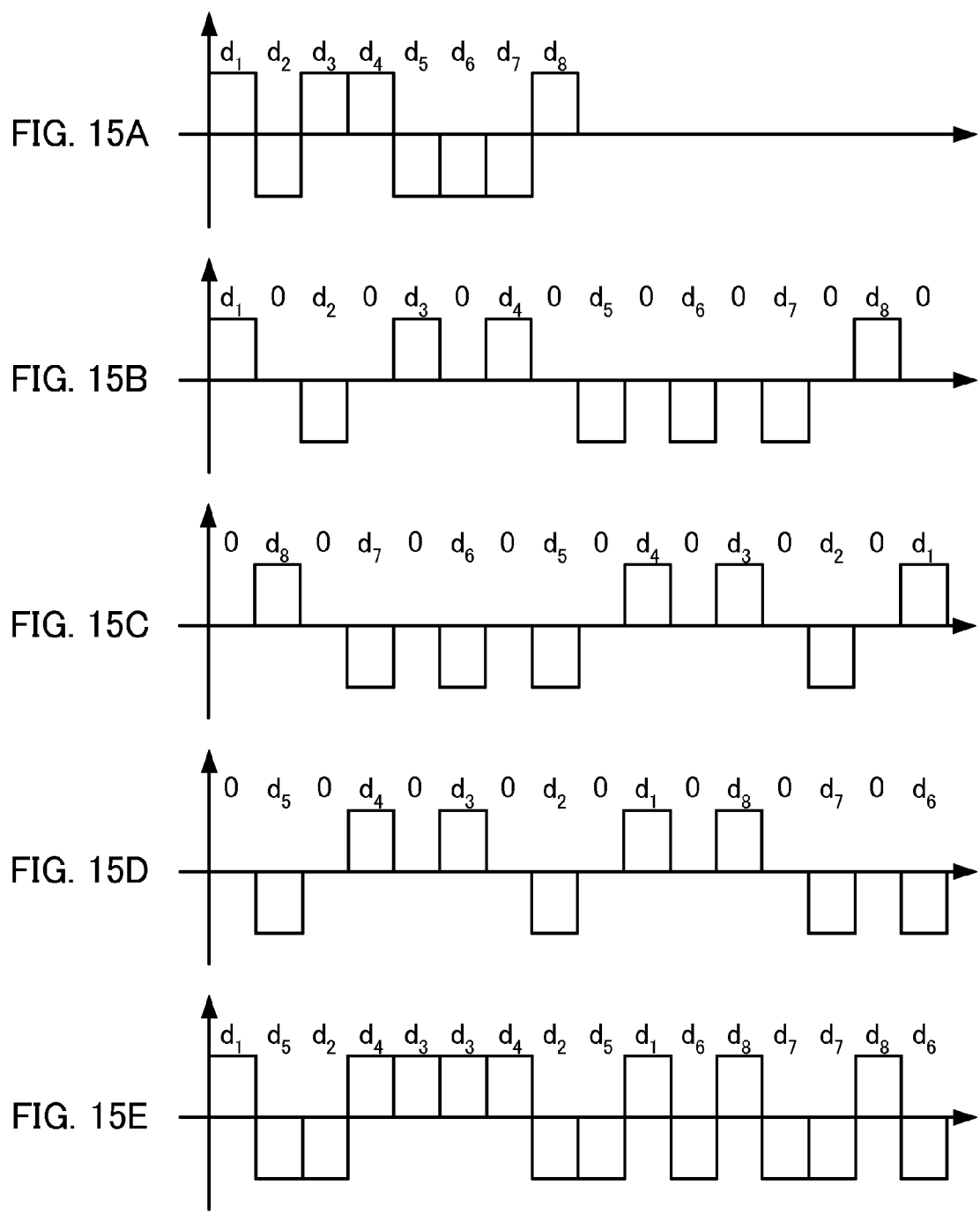
FIGS. 15A to 15E are charts illustrating an example of the arithmetic processing at the transmission side of the communication apparatus according to the second embodiment.

An example of the arithmetic process at the transmission side of the communication apparatus 1 will be described with reference to FIGS. 15A to 15E. Here, the modulation signal has eight elements and the FFT size is 16. In the figure, the elements are plotted as abscissa and the values of the elements are plotted as ordinate. For easier explanation, only the real parts of the elements are represented. The inserter 13 inserts zero immediately after each element of the modulated signal d shown in FIG. 15A to generate inserted data f shown in FIG. 15B. The reverser 18 reverses the element of the inserted data f to generate reversed data g shown in FIG. 15C. For example, using k=6, the shifter 19 shifts the reversed data six times upward to generate shifted data $g^{(k)}$ shown in FIG. 15D. FIG. 15E shows the arithmetic data h generated by adding the shifted data $g^{(k)}$ to the inserted data f. The IFFT unit 14 performs the IFFT on the inserted data f shown in FIG. 15B and the IFFT on the arithmetic data h shown in FIG. 15E.

The determiner 16 generates baseband signals corresponding to the respective arithmetic result of the inserted data f and arithmetic data h of the IFFT unit 14. The determiner 16 calculates the PAPRs of the baseband signals and determines whether each PAPR matches with a predetermined reference.

If neither of the PAPRs matches with the predetermined reference, the determiner 16 notifies the shifter 19 accordingly. In such a case, the shifter 19 changes the number of shifts of the reversed data g and generates new shifted data $g^{(k')}$. The IFFT unit 14 performs IFFT on the new arithmetic data h obtained by adding the new shifted data $g^{(k')}$ to the inserted data f. The determiner 16 calculates the PAPR of the baseband signal corresponding to the arithmetic result of the new arithmetic data h, and determines whether the PAPR matches with the predetermined reference. The shifter 19 and IFFT unit 14 repeats the above process until the determiner 16 determines that the PAPR matched with the predetermined reference.

In this way, the PAPR of the baseband signal can be reduced. Here, in the above repeated process, only the arithmetic data h is processed; the inserted data f is not processed.

The controller 20 controls the shifter 19, IFFT unit 14, and determiner 16 to repeat the above processing, operating as a repeat means.

Furthermore, the determiner 16 sends the baseband signal of which the PAPR matches with a predetermined reference to the transmitter 17. Here, the determiner 16 can be configured to repeat the above process until the shifter 19 completes one cycle of shifting the reversed data g and detecting the baseband signal that have the lowest PAPR. Furthermore, the determiner 16 can be configured to detect the baseband signals in which the PAPR is lower than a predetermined value.

The transmitter 17 receives the baseband signal from the determiner 16 and generates a transmission signal from the baseband signal. The transmitter 17 sends the generated transmission signal to another apparatus via the transmission/reception switch 36 and antenna 10.

Figure 16:
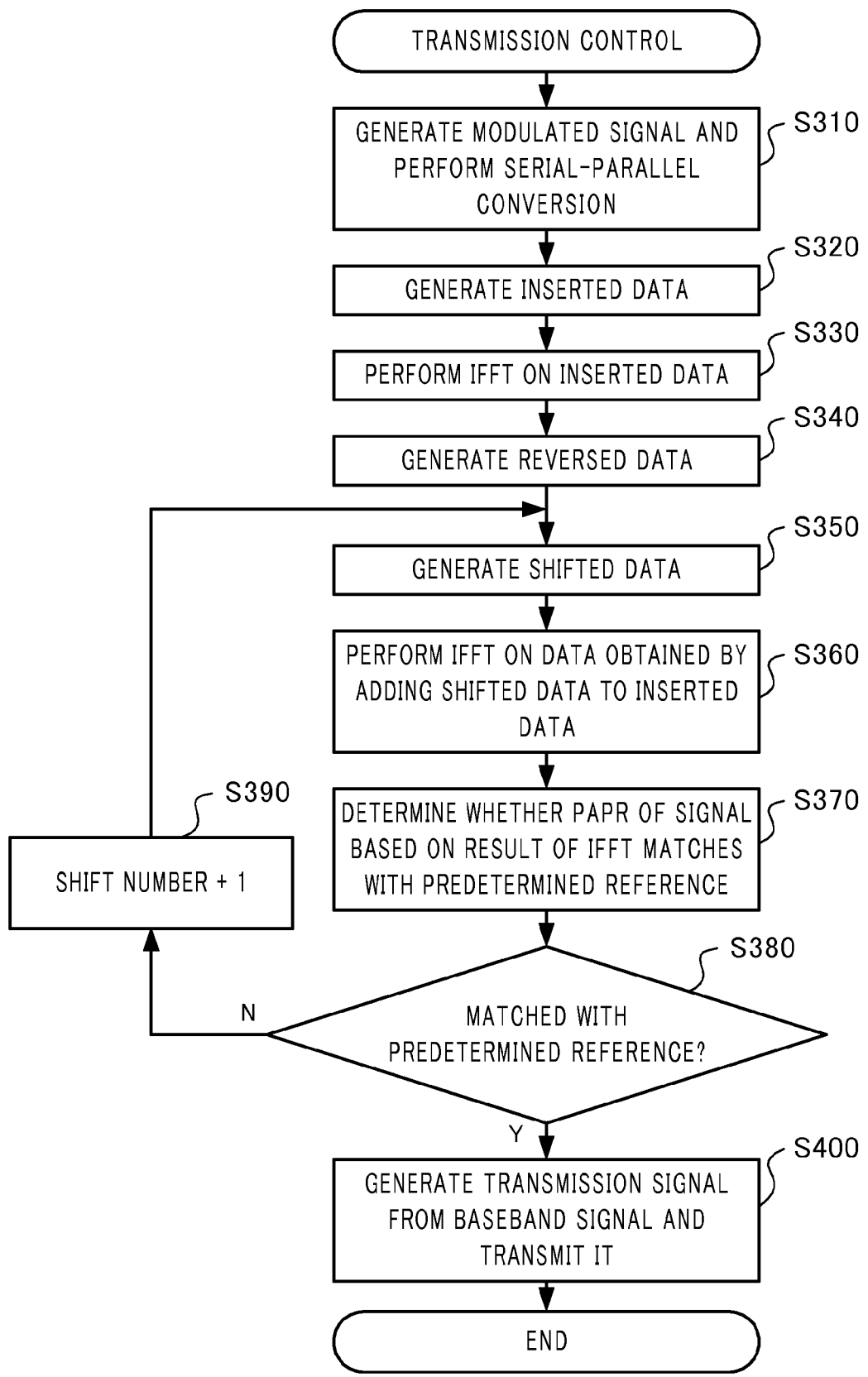
FIG. 16 is a flowchart illustrating an example of the operation for transmission control that is executed by the communication apparatus according to the second embodiment.

The transmission control operation executed by the communication apparatus 1 will be described with reference to the flowchart shown in FIG. 16. The modulator 11 modulates the input signal to generate the modulated signal. The serial-parallel converter 12 performs serial-parallel conversions on the modulated signal generated by the modulator 11 (step S310). The inserter 13 inserts the predetermined complex number in the serial-parallel converted modulated signal immediately before or after each element thereof to generate inserted data f of which the number of elements is equal to the FFT size (step S320). The IFFT unit 14 performs the IFFT on the inserted data f (step S330). The reverser 18 reverses the element of the inserted data f to generate reversed data g (step S340).

The shifter 19 shifts the reversed data g a predetermined number of times that is a multiple number of 2 in a predetermined direction. Then, the shifted data $g^{(k)}$ that are the reversed data after being shifted are generated (step S350). For example, when the number of shifts is zero, the shifted data $g^{(k)}$=g. The IFFT unit 14 performs the IFFT on the arithmetic data h obtained by adding the shifted data $g^{(k)}$ to the inserted data f (step S360). The determiner 16 generates the baseband signals corresponding to the respective arithmetic result of the inserted data f and arithmetic data h of the IFFT unit 14. The determiner 16 calculates the PAPRs of the baseband signals, and determines whether each PAPR matches with the predetermined reference (step S370).

If the determiner 16 determines that neither of the PAPRs does not match with the predetermined reference (step S380; N), the shifter 19 adds one to the number of shifts (step S390) and returns to the step S350. In such a case, the shifter 19 generates new shifted data $g^{(k')}$ based on the new number of shifts and the IFFT unit 14 and determiner 16 performs the above process. On the other hand, if there is a PAPR matching with a predetermined reference (step S380; Y), the determiner 16 sends the baseband signal corresponding to the PAPR to the transmitter 17. The transmitter 17 generates the transmission signal from the baseband signal received from the determiner 16. The transmitter 17 sends the generated transmission signal to another apparatus via the transmission/reception switch 36 and antenna 10 (step S400). After the transmission in the step S400 is completed, the process ends. Here, the above method of repeating is given by way of example and the number of shifts can be changed by any method.

A process at the reception side will be described following. The receiver 35 receives the transmission signal via the antenna 10 and transmission/reception switch 36. The receiver 35 generates a baseband signal from the transmission signal, and performs a serial-parallel conversion on the baseband signal. The receiver 35 sends the serial-parallel converted baseband signals to the FFT unit 34. The FFT unit 34 performs an FFT on the serial-parallel converted baseband signal to generate converted data and sends the converted data to the divider 38.

The divider 38 divides the converted data into a first set data comprising the odd-numbered elements of the converted data and the second set data comprising the even-numbered elements of the converted data. The divider 38 designates a predetermined one of the first data and the second data as the reference data. Furthermore, the divider 38 reverses the elements of the other to generate reversed received data. The divider 38 sends the reference data and reversed received data to the correlator 37. For example, when a predetermined complex number is inserted into the serial-parallel converted modulated signal immediately after each element thereof at the transmission side, the first set of data is designated as the reference data and the reversed received data are generated based on the second set of data. On the other hand, for example, when a predetermined complex number is inserted into the serial-parallel converted modulated signal immediately before each element thereof at the transmission side, the second set of data is designated as the reference data and the reversed received data are generated based on the first set of data. Here, it is assumed that the reception side retains information on the positions of the predetermined complex number inserted at the transmission side in advance.

The correlator 37 repeats the process of determining whether there is a correlation between the reversed received data shifted a predetermined number of times in a predetermined direction and the reference data with changing the number of shifts. The correlator 37 determines that there is a correlation between the shifted data and the reference data if the correlation value between the shifted data and the reference data is equal to or greater than a threshold. The threshold is determined according to the possible maximum value of the correlation value. The threshold is, for example, ¾ in the case of normalized correlation analysis.

If the shifted data are correlated to the reference data, the correlator 37 obtains the respective average value of the elements between the reference data and shifted data. Furthermore, the correlator 37 subtracts a predetermined complex number from average value obtained in each element. The correlator 37 generates restored data of which the elements are the values after the subtraction on the basis of element. The given complex number is the same as the predetermined complex number used at the transmission side. It is assumed that the reception side retains information on the predetermined complex number in advance. Obtaining the respective average value of the elements between the reference data and reversed received data can lead to reducing noise components contained in the data.

As shown by the above equation (7), when a predetermined complex number, 0, is inserted immediately after each element of the serial-parallel converted modulated signal at the transmission side, the restored data comprises the respective average value of the elements between the reference data and reversed received data.

If no data is correlated to the reference data, the correlator 37 uses the reference data as the restored data. The correlator 37 sends the restored data to the parallel-serial converter 32.

An example of the arithmetic process at the reception side of the communication apparatus 1 will be described with reference to FIGS. 17A to 17D. In FIGS. 17A to 17D, the elements are plotted as abscissa and the values of the elements are plotted as ordinate. For easier explanation, only the real parts of the elements are shown. Here, it is assumed that the transmission side sends the baseband signal corresponding to the arithmetic data h shown in FIG. 15E. FIG. 17A shows the converted data. FIG. 17B shows the first set of data. FIG. 17C shows the second set of data. FIG. 17D shows the reversed received data. The divider 38 designates the first set of data as the reference data and reverses the second set of data to generate reversed received data.

The correlator 37 determines whether there is a correlation between the reversed received data and the reference data. Furthermore, the correlator 37 shifts the reversed received data a predetermined number of times in a predetermined direction and determines whether there is a correlation between the shifted data and the reference data. The correlator 37 repeats the determination with changing the number of shifts. The shifted data obtained by shifting the reversed received data or parallel signal shown in FIG. 17D three times upward are equal to the reference data, and then the correlation value between this shifted data and the reference data is equal to or greater than a threshold. In such a case, the correlator 37 generates the restored data comprising the data of which the elements are the respective average values of the elements between the reference data and the reversed received data shifted three times upward.

Figure 18A:
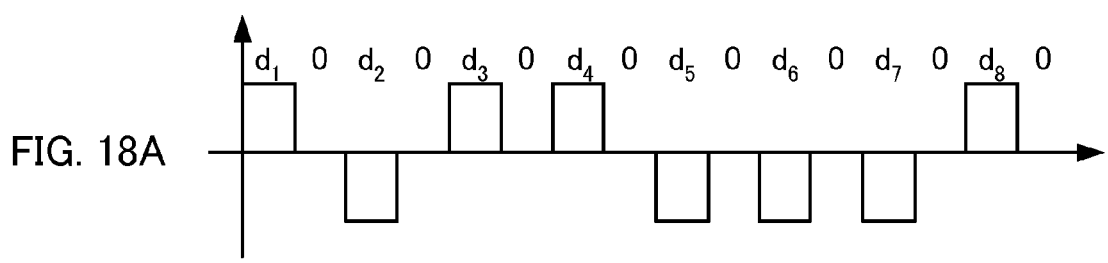
FIGS. 18A to 18C are charts illustrating an example of the arithmetic processing on the reception side of the communication apparatus according to the second embodiment.
Figure 18B:
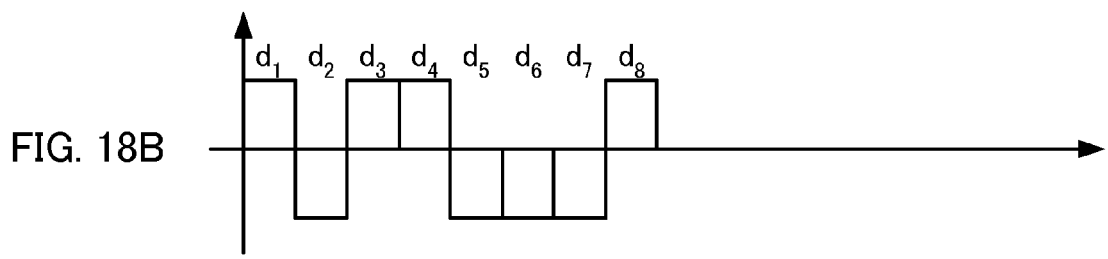
Figure 18C:
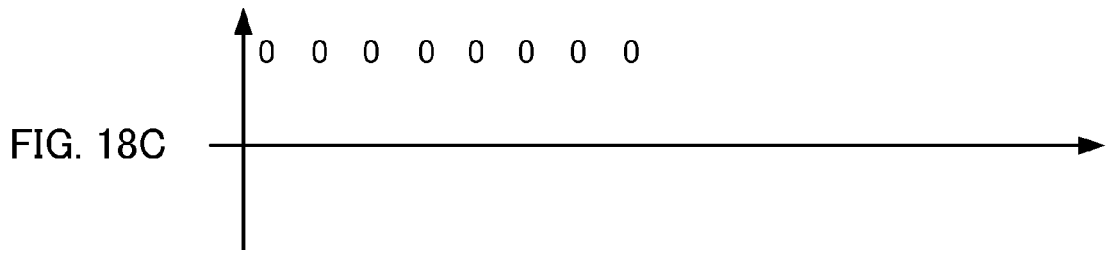

Another example of the arithmetic process at the reception side of the communication apparatus 1 will be described with reference to FIGS. 18A to 18C. Here, it is assumed that the transmission side sends the baseband signal corresponding to the inserted data f shown in FIG. 15B. FIG. 18A shows the converted data. FIG. 18B shows the first set of data. FIG. 18C shows the second set of data and reversed received data.

The correlator 37 determines whether there is a correlation between the reversed received data and the reference data as in the above case. Furthermore, the correlator 37 shifts the reversed received data the predetermined number of times in the predetermined direction and determines whether there is the correlation between the shifted data and the reference data. The correlator 37 repeats the determination with changing the number of shifts. However, in this case, none of the shifted data has the correlation with the reference data. When no data have the correlation with the reference data as in this case, the correlator 37 uses the reference data as the restored data.

In both cases of FIGS. 17 and 18, the restored data are equal to the modulated signal shown in FIG. 15A. The parallel-serial converter 32 performs parallel-serial conversion on the restored data and sends them to the demodulator 31. The demodulator 31 demodulates the parallel-serial converted, restored data to restore the input signal.

Figure 19:
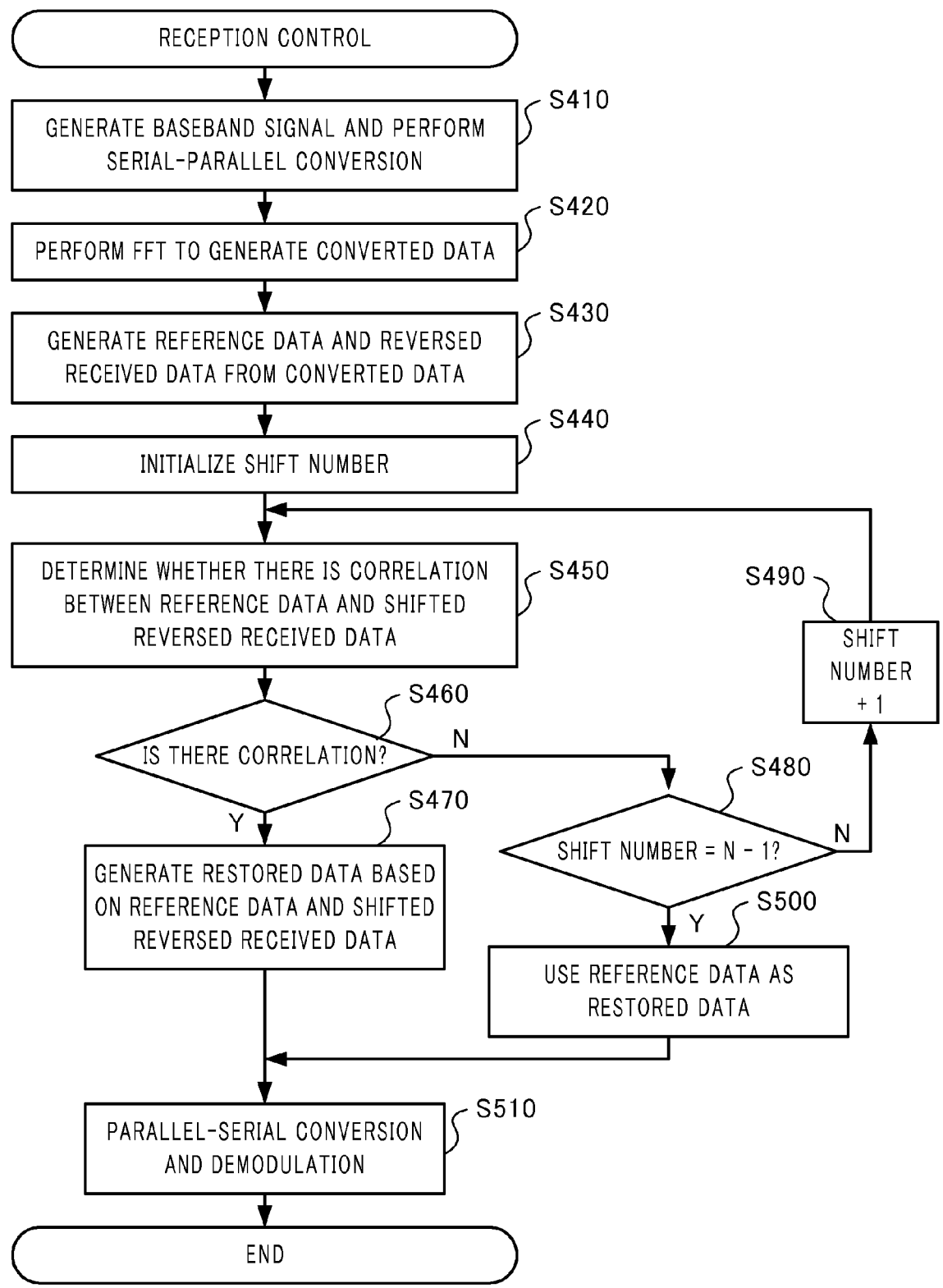
FIG. 19 is a flowchart illustrating an example of the operation for reception control that is excused by the communication apparatus according to the second embodiment.

The reception control operation executed by the communication apparatus 1 will be described with reference to the flowchart shown in FIG. 19. The receiver 35 receives transmission signal via the antenna 10 and transmission/reception switch 36. The receiver 35 generates the baseband signal from the transmission signal and performs the serial-parallel conversion on the baseband signal (step S410). The FFT unit 34 performs the FFT on the serial-parallel converted baseband signal by the receiver 35, to generate converted data (step S420). The divider 38 divides the converted data into the first set of data comprising the odd-numbered elements of the converted data and the second set of data comprising the even-numbered elements of the converted data. The divider 38 designates the predetermined one of the first set of data and the second set of data as the reference data. Furthermore, the divider 38 reverses the elements of the other to generate reversed received data (step S430).

The correlator 37 is initialized by zero to the number of shifts (step S440). The correlator 37 determines whether there is the correlation between the reference data and the reversed received data shifted zero time upward (step S450). If there is the correlation between the reference data and the shifted data (step S460; Y), the correlator 37 uses data of which the elements are the respective average values of the elements between the reference data and shifted data from each of which the predetermined complex number is subtracted as the restored data (step S470).

If there is no correlation between the reference data and the shifted data (step S460; N), proceeds to step S480. In the above case, the number of shifts is zero, not N−1 (step S480; N); therefore, one is added to the number of shifts (step S490). Then, returning to the step 450, the above process is repeated. When the number of shifts has reached N−1 as a result of repeating the above process (step S480; Y), the correlator 37 uses the reference data as the restored data (step S500). The parallel-serial converter 32 performs parallel-serial conversion on the restored data. The demodulator 31 demodulates the parallel-serial converted restored data to restore the input data (step S510). After the restoration in the step S10 is completed, the process ends. Here, the above method of repeating is given by way of example and the number of shifts can be changed by any method.

As described above, the communication apparatus 1 according to this embodiment inserts the predetermined complex number in the modulated signal, to generate inserted data of which the number of elements is equal to the FFT size in an OFDM communication scheme. Furthermore, the communication apparatus 1 generates the arithmetic data by combining the shifted data that is the inserted data reversed and shifted with the inserted data. The communication apparatus 1 calculates the PAPRs of the baseband signals corresponding to the inserted data and arithmetic data, respectively, and determines whether each PAPR matches with the predetermined reference. Furthermore, the communication apparatus 1 repeats the process of generating new arithmetic data using different shifted data until the PAPR of the baseband signal matches with the predetermined reference. Thus, the PAPR of the baseband signal corresponding to the inserted data or arithmetic data can be reduced. Furthermore, repeating the above process is simpler than repeating the calculation in a sequential decision method; thus, the communication apparatus 1 according to this embodiment can simplify the process for reducing the PAPR.

Furthermore, if the shifted data are correlated to the reference data at the reception side, noise components contained in the data can be reduced by obtaining the respective average values of the elements between the reference data and shifted data.

Specific Example

The prior art communication apparatus and the communication apparatus 1 according to this embodiment were compared in the CCDF characteristic of the PAPR, namely the probability of occurrence of the PAPR, using a QPSK modulation scheme with an FFT size of 2048. The prior art communication apparatus performs serial-parallel-conversion on the modulated input signal without the above arithmetic processing and performs the IFFT to generate baseband signals.

Figure 20:
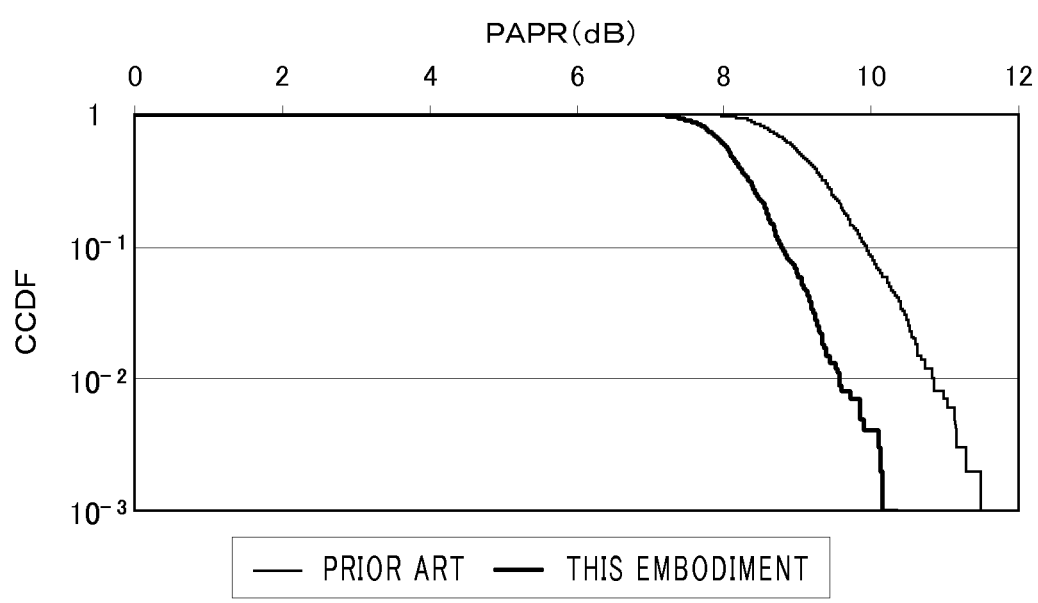
FIG. 20 is a diagram illustrating CCDF characteristic of the PAPR of simulated baseband signal according to the second embodiment.

The communication apparatus 1 according to this embodiment inserted a zero into the serial-parallel converted, modulated signal having 1,024 elements immediately after each element thereof to generate inserted data f. FIG. 20 shows the CCDF characteristic of the PAPR of the baseband signal. In FIG. 20, the PAPR is plotted as abscissa (unit: dB) and the PAPR CCDF is plotted as ordinate. The CCDF characteristic of PAPR according to the prior art is represented by the thin solid line. The CCDF characteristic of PAPR according to this embodiment is represented by the thick solid line. The PAPR according to this embodiment is lower than the prior art PAPR.

When the input signal was identical signal of which the modulated signal comprise elements having an identical phase, for example elements all having a value of zero, the PAPR according to this embodiment was 30.10 dB while the prior art PAPR was 33.11 dB. Also in the case, the PAPR according to this embodiment is lower than the prior art PAPR.

Figure 21:
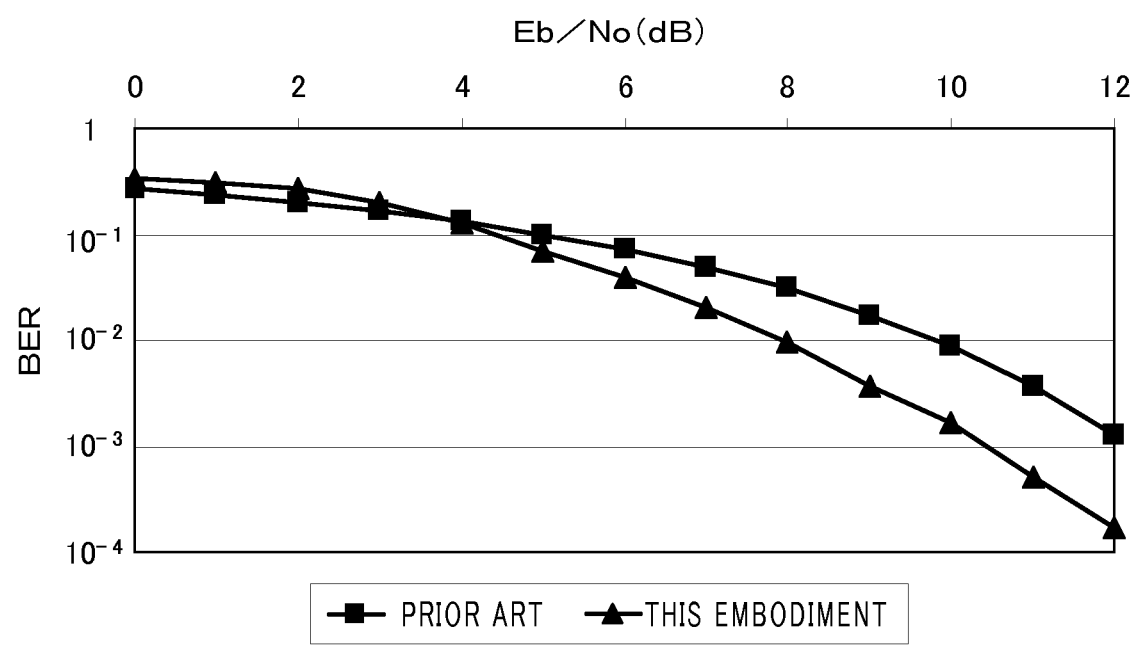
FIG. 21 is a diagram illustrating BER characteristic according to the second embodiment.

FIG. 21 shows the BER characteristic. In FIG. 21, the Eb/No is plotted as abscissa and the BER is plotted as ordinate. The Eb/No is represented in dB. The prior art BER is plotted using squares. The BER according to this embodiment is plotted using triangles. As shown in FIG. 21, the BER according to this embodiment is improved compared with the prior art BER particularly in a range where the noise level is high.

Figure 22:
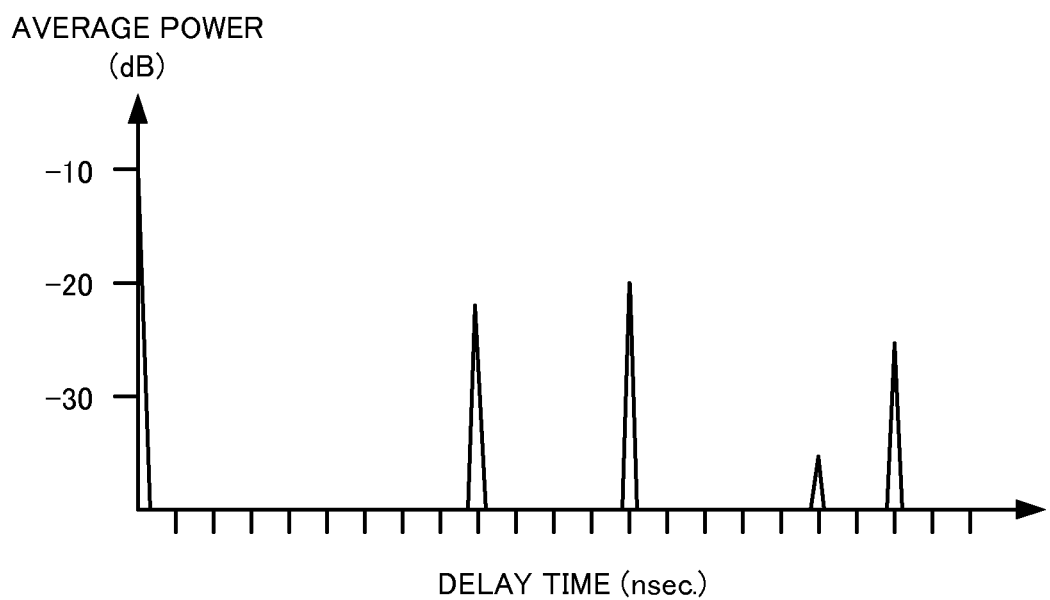
FIG. 22 is a diagram illustrating a general delay profile of the transmission path used in a simulation according to the second embodiment.

Influence of fading on the transmission path was simulated. The number of multipaths was six and the number of wavelets arriving at the reception side antenna was 32. The values shown in following Table 1 were used as the delay profile presenting the relationship between the time delay of delayed waves comprising wavelets and the average power or the average received power in a predetermined segment of the antenna including a predetermined number of wavelengths. FIG. 22 shows a general delay profile on the transmission path.

TABLE 1

| Time delay (nsec.) | Average electric power (dB) |
|---|---|
| 0 | −2.5 |
| 300 | 0 |
| 8900 | −12.8 |
| 12900 | −10.0 |
| 17100 | −25.5 |
| 2000 | −16.0 |

As for the Doppler shift, the reference subcarrier frequency was 5.6 GHz and the moving speed of the transmission side communication apparatus was variable. The OFDM communication scheme used in the simulation included no interleaving or error correction. The pilot signal was a signal of which the elements are all "1". The zero-order interpolation was performed at the reception side and the equalization was performed by zero-forcing.

Figure 23A:
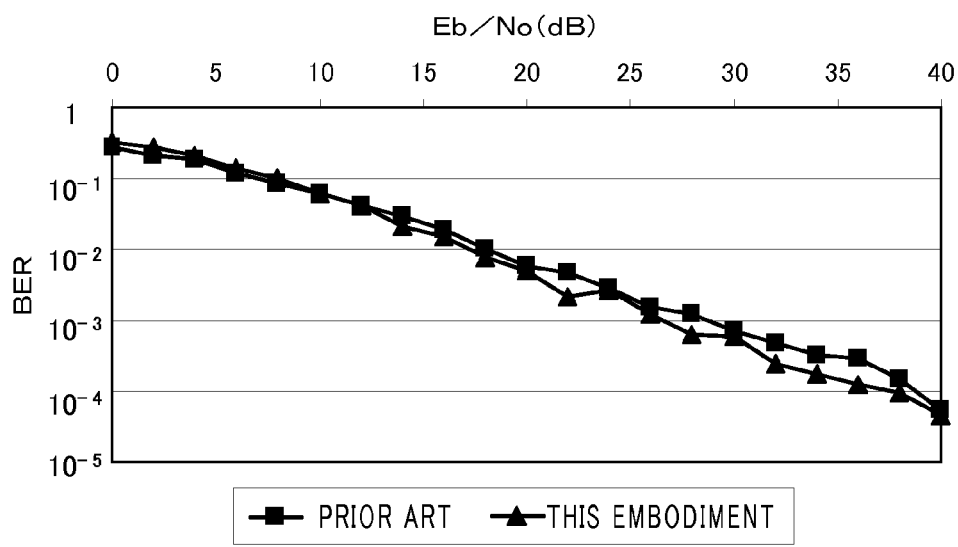
FIGS. 23A to 23C are diagrams illustrating the relationship between the BER and moving speed according to the second embodiment.
Figure 23B:
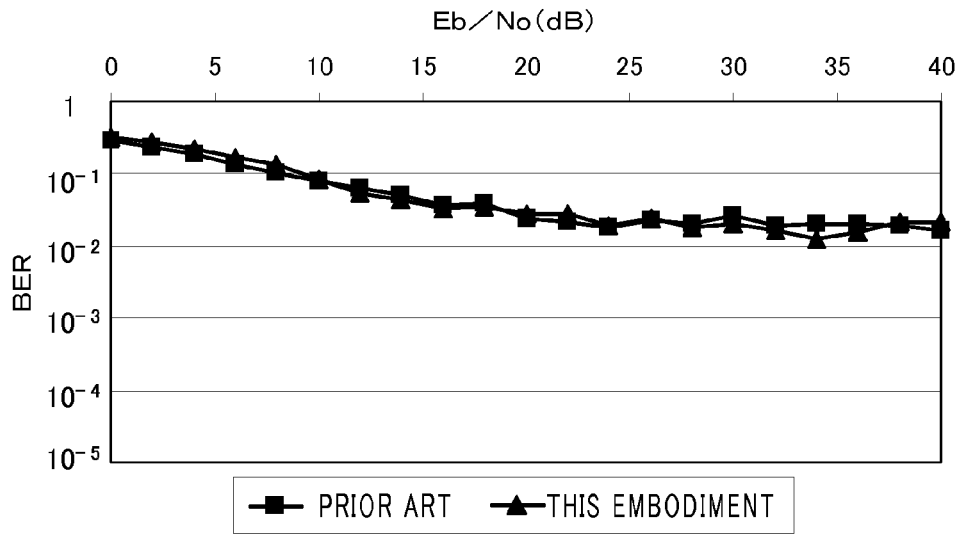
Figure 23C:
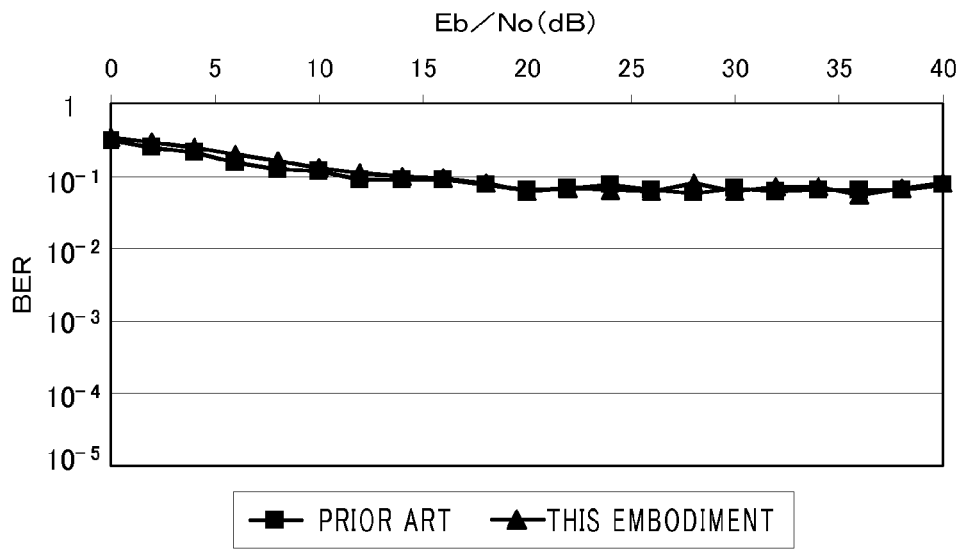

The change of simulated BER will be described. FIGS. 23A to 23C are diagrams illustrating the relationship between the BER and moving speed. The Eb/No is plotted as abscissa and the BER is plotted as ordinate. The Eb/No is represented in dB. The prior art BER is plotted using squares. The BER according to this embodiment is plotted using triangles. FIG. 23A shows the BER when the moving speed is 0 km/h. FIG. 23B shows the BER when the moving speed is 50 km/h. FIG. 23C shows the BER when the moving speed is 100 km/h. As the moving speed is increased, the BER is deteriorated. It is understood that the BER according to this embodiment is improved more when the moving speed is less.

The above simulation revealed that the PAPR can be reduced and the BER can be improved by executing the predetermined arithmetic processing on the modulated signal and repeating the process until the baseband signal matching the predetermined reference are detected.

The modulation scheme of the modulator 11 is not limited to the QPSK. Besides the QPSK, the PSK, QAM, or the like can be used. Furthermore, the order of the process performed by the serial-parallel converter 12 and inserter 13 can be changed. In other words, the configuration in which the serial-parallel converter 12 performs serial-parallel conversion on the inserted data generated by the inserter 13 is possible.

Furthermore, the predetermined complex number is not limited to zero. When the inserter 13 uses the predetermined complex number $\alpha$, the data of the above equation (7), (8), and (9) in which zero is replaced with $\alpha$ are the inserted data f, reversed data g, and shifted data $g^{(k)}$, respectively. Furthermore, the arithmetic data h are expressed by the following equation (11).

[Eq. 11]

$$h = f + g^{(k)} \qquad (11)$$
$$= [d_1 + \alpha \ \ d_{M-i} + \alpha \ \ d_2 + \alpha \ \ d_{M-i-1} + \alpha \ \ldots \ d_M + \alpha \ \ d_{M-i+1} + \alpha]^T$$

When the baseband signal corresponding to the arithmetic data h expressed by the above equation (11) is sent, the correlator 37 at the reception side uses data of which the elements are the respective average values of the elements between the reference data and reversed received data from each of which the predetermined complex number is subtracted as the restored data. Furthermore, the correlator 37 may use, as the restored data, data of which the elements are the respective average values of the elements between the data comprising the elements of the reference data from each of which the predetermined complex number is subtracted and the data comprising the elements of the reversed received data from each of which the predetermined complex number is subtracted.

Furthermore, the IFFT unit 14 can be configured to perform the IDFT instead of the IFFT and the FFT unit 34 can be configured to perform the DFT instead of the FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein

What is claimed is:

1. A communication apparatus, comprising:
   a modulator that modulates an input signal to generate a modulated signal;
   an inserter that adds all elements of a predetermined redundant signal at a predetermined position of the modulated signal and generates inserted data including all the elements of the modulated signal modulated by the modulator, of which a sum of all elements of the modulated signal and all the added elements of the redundant signal is equal to a size of Fast Fourier Transformation (FFT);

a determiner that calculates Peak-to-Average Power Ratio (PAPR) of a baseband signal corresponding to the inserted data, and determines whether the PAPR satisfies a predetermined reference; and a transmitter that transmits a transmission signal corresponding to the baseband signal when the determiner determines that the reference is satisfied; wherein:

the inserter shifts all the elements of the redundant signal a predetermined number of times in a predetermined direction while maintaining the positional relationship of each element and adds all the elements of the shifted redundant signal at the predetermined position of the modulated signal when the determiner determines that the PAPR does not satisfy with the predetermined reference, to generate new inserted data.

2. The communication apparatus according to claim 1, wherein:

the determiner calculates the PAPR of the baseband signal corresponding to the new inserted data.

3. The communication apparatus according to claim 2, wherein:

the determiner determines whether the PAPR of the baseband signal corresponding to the new inserted data matches with the predetermined reference, and the inserter repeats a process that generates the new inserted data until the determiner determines that the PAPR matches with the predetermined reference.

4. The communication apparatus according to claim 1, comprising:

a receiver that receives the transmission signal and generates baseband signal from the transmission signal;

a converted data generator that performs FFT on the baseband signal to generate converted data;

an extractor that extracts the element corresponding to the position of the element of the modulated signal based on a rule predetermined with the transmission source of the transmission signal; and a demodulator that demodulates data comprising the extracted element.

5. A communication apparatus, comprising:

a modulator that modulates an input signal to generate a modulated signal;

an inserter that adds predetermined elements at predetermined positions of the modulated signal and generates inserted data including all the elements of the modulated signal modulated by the modulator, of which a sum of all elements of the modulated signal and the added element is equal to a size of Fast Fourier Transformation (FFT);

a reverser that reverses order of all the elements of the inserted data generated by the inserter;

an Inverse Fast Fourier Transformation (IFFT) unit that generates an arithmetic data in which the reversed data and the inserted data are added, a determiner that calculates Peak-to-Average Power Ratio (PAPR) of baseband signals corresponding to each of the inserted data and the arithmetic data, and determines whether the PAPR satisfies a predetermined reference; and a transmitter that transmits a transmission signal corresponding to the baseband signal having the PAPR determined by the determiner that the reference is satisfied.

6. The communication apparatus according to claim 5, wherein:

the element inserted into the modulated signal are a predetermined complex number different from any possible value of the elements of the modulated signal, and the inserter inserts the complex number into the modulated signal at the predetermined position, to generate the inserted data.

7. The communication apparatus according to claim 5, further comprising:

a shifter that shifts the reversed data, wherein:

the shifter shifts all the elements of the reversed data a predetermined number of times in a predetermined direction while maintaining the positional relationship of each element when the determiner determines that any of the PAPR does not match with the predetermined reference, the IFFT unit generates new arithmetic data in which the shifted data that are the reversed data after being shifted and the inserted data are added, and the determiner generates the baseband signal corresponding to the new arithmetic data and determines whether the PAPR of the baseband signal corresponding to the new arithmetic data matches with the predetermined reference.

8. The communication apparatus according to claim 7, wherein:

the shifter shifts the reversed data by changing the number of shifts when the determiner determines that the PAPR does not match with the predetermined reference.

9. The communication apparatus according to claim 5, further comprising:

a receiver that receives the transmission signal and generates baseband signal from the transmission signal;

a converted data generator that performs FFT on the baseband signal to generate converted data;

a divider that divides the converted data into two sets of data based on a rule predetermined with the transmission source of the transmission signal and generates reversed received data that are one of the sets of divided data of which the element are reversed;

a correlator that determines whether there is a predetermined correlation between the reference data that are the other set of divided data and the reversed received data and if there is a correlation, generates restored data of which the element are the respective average values of the elements between the reference data and the reversed received data from each of which a complex number predetermined with the transmission source is subtracted; and a demodulator that demodulates the restored data generated by the correlator.

10. The communication apparatus according to claim 9, wherein:

the correlator determines repeatedly whether there is the correlation with changing the number of shifts of the reversed received data, and if none of the shifted data has the correlation with the reference data, uses the reference data as the restored data, and the demodulator demodulates the reference data used as the restored data by the correlator.

11. A communication method, comprising:

a modulation step of modulating an input signal to generate a modulated signal;

an insertion step of adding all elements of a predetermined redundant signal at a predetermined position of the modulated signal and generating inserted data including all the elements of the modulated signal modulated in the modulation step, of which a sum of all elements of the modulated signal and all the added elements of the redundant signal is equal to a size of Fast Fourier Transformation (FFT);

a determination step of calculating Peak-to-Average Power Ratio (PAPR) of a baseband signal corresponding to the inserted data, and determining whether the PAPR satisfies a predetermined reference; and a transmission step of transmitting a transmission signal corresponding to the baseband signal in the determination step, the PAPR is determined to satisfy the reference; wherein:

in the insertion step, all the elements of the redundant signal are shifted a predetermined number of times in a predetermined direction while maintaining the positional relationship of each element and all the elements of the shifted redundant signal are added at the predetermined position of the modulated signal when the PAPR is determined not to satisfy the reference in the determination step, to generate new inserted data.

* * * * *